(12) United States Patent
Chen et al.

(10) Patent No.: US 12,463,462 B2
(45) Date of Patent: Nov. 4, 2025

(54) MULTI-CAPACITOR ENERGY HARVESTING

(71) Applicant: Qualcomm Incorporated, San Diego, CA (US)

(72) Inventors: Minghui Chen, San Diego, CA (US); Andrea Fenaroli, San Diego, CA (US); Chengjin Zhang, San Diego, CA (US); Yiwu Tang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/606,622

(22) Filed: Mar. 15, 2024

(65) Prior Publication Data

US 2025/0293543 A1    Sep. 18, 2025

(51) Int. Cl.
| | |
|---|---|
| *H02J 50/00* | (2016.01) |
| *G06K 19/077* | (2006.01) |
| *H02J 7/00* | (2006.01) |
| *H02J 50/20* | (2016.01) |

(52) U.S. Cl.
CPC ...... *H02J 50/001* (2020.01); *G06K 19/07773* (2013.01); *H02J 7/0047* (2013.01); *H02J 7/007182* (2020.01); *H02J 50/20* (2016.02); *H02J 2207/50* (2020.01)

(58) Field of Classification Search
CPC .... H02J 50/001; H02J 50/20; H02J 7/007182; H02J 7/0047; H02J 2207/50; G06K 19/07773
See application file for complete search history.

(56) References Cited

U.S. PATENT DOCUMENTS

| | | | |
|---|---|---|---|
| 9,800,172 B1 | 10/2017 | Leabman | |
| 10,383,126 B2 | 8/2019 | Gollakota et al. | |
| 2012/0256492 A1 | 10/2012 | Song et al. | |
| 2015/0256097 A1* | 9/2015 | Gudan .................. | H02M 3/338 |
| | | | 363/125 |
| 2015/0311706 A1 | 10/2015 | Noguchi et al. | |
| 2018/0145518 A1 | 5/2018 | Onizuka et al. | |
| 2021/0249890 A1 | 8/2021 | Wang et al. | |

FOREIGN PATENT DOCUMENTS

WO    2016071905 A1    5/2016

OTHER PUBLICATIONS

Partial International Search Report—PCT/US2025/011887—ISA/EPO—May 21, 2025.
International Search Report and Written Opinion—PCT/US2025/011887—ISA/EPO—Jul. 3, 2025.

* cited by examiner

*Primary Examiner* — Laura A Gudorf
(74) *Attorney, Agent, or Firm* — Loza & Loza

(57) ABSTRACT

An apparatus is disclosed for multi-capacitor energy harvesting. In example aspects, the apparatus includes energy storage including a first capacitor and a second capacitor. The apparatus also includes an energy harvester including at least one rectifier and one or more switches. The switches can be controlled to initially charge the first capacitor and subsequently charge the second capacitor.

9 Claims, 16 Drawing Sheets

MULTI-CAPACITOR ENERGY HARVESTING

TECHNICAL FIELD

This disclosure relates generally to energizing an apparatus remotely and, more specifically, to circuitry having multiple capacitors to facilitate energy harvesting.

BACKGROUND

An electronic tag, such as a radio-frequency identification (RFID) tag, can provide information for different purposes. For example, in response to receiving an RF inquiry, an electronic tag can respond to the inquiry with a wireless signal carrying data. The data can represent different types of information depending on the intended use of the electronic tag. Uses of electronic tags include traceability in the supply chain, logistics and inventory in the retail industry, information technology (IT) asset tracking, and human traceability and access control. Other electronic tag uses can involve tracking animals for wildlife preservation and livestock management, monitoring athletic performance, tracking vehicles or tools, and monitoring environmental conditions.

Accordingly, data stored by an electronic tag can represent information related to any of these or other activities. For example, the stored data can include an identifier of an object corresponding to the electronic tag, which object may carry the tag. The stored data may also indicate ownership, financial value, or the appropriate care for a corresponding object, such as storage temperature or potential fragility. The data stored by a tag may further include a history of information associated with an object, such as a location or custodial history. An electronic tag may also sense activity (e.g., speed or acceleration) or environmental conditions and record the sensed activity or conditions. Any of this data can then be employed to keep objects or facilities safe, learn about an object or an environment associated with an electronic tag, manage assets, and so forth.

Accordingly, researchers, electrical engineers, and designers of electronic tags strive to develop technologies that can facilitate these and other uses of electronic tags.

SUMMARY

Some apparatuses, like electronic tags, can collect energy by receiving a wireless signal, such as a radio-frequency (RF) signal, and storing the collected energy with a capacitor. The capacitor then powers a load of an electronic tag or other apparatus while the stored energy is being depleted from the capacitor. An electronic tag may not, however, receive an optimal RF signal. For example, an RF signal may not be received at an electronic tag with a minimum operational voltage for circuitry of the tag. Further, an electronic tag may not receive sufficient power to operate the circuitry consistently. To address these problems, this document describes example implementations for apparatuses that include two capacitors for energy harvesting. These two capacitors can have different capacitances. In some implementations, a relatively larger capacitor is charged to a first voltage level based on a strength of a received RF signal. A higher, second voltage level is generated by transferring stored charge from the larger capacitor to a relatively smaller capacitor. This second voltage level can be sufficient to operate a load, such as circuitry of an electronic tag, even if the first voltage level is insufficient. In other implementations, a relatively smaller capacitor is charged first. After the smaller capacitor reaches a voltage level that is usable by a load of an apparatus, the smaller capacitor can be used to power the load, such as circuitry of an electronic tag. Meanwhile, a relatively larger capacitor can then also be charged by the received RF signal. Once the larger capacitor reaches the minimum voltage for powering the load, the larger capacitor can be coupled to the load and discharged. With this shared charging mechanism, the load becomes usable more consistently over time. Still other implementations involve employing an efficient voltage monitor having low leakage current. These and other implementations are described herein.

In an example aspect, an apparatus for multi-capacitor energy harvesting is disclosed. The apparatus includes a first capacitor, a second capacitor, and an energy harvester. The energy harvester includes a first rectifier, an oscillator, and a second rectifier. The first rectifier is coupled to the first capacitor. The oscillator includes an input and an output, with the input coupled to the first capacitor. The second rectifier is coupled between the output of the oscillator and the second capacitor.

In an example aspect, a method for operating a multi-capacitor energy harvester is disclosed. The method includes receiving a wireless signal and rectifying the wireless signal to produce a first voltage at a first capacitor. The method also includes generating an oscillating signal based on the first voltage at the first capacitor. The method additionally includes rectifying the oscillating signal to produce a second voltage at a second capacitor. The method further includes powering a load using the second voltage at the second capacitor.

In an example aspect, another apparatus for multi-capacitor energy harvesting is disclosed. The apparatus includes a first capacitor, a second capacitor, a power supply node, and an energy harvester. The energy harvester includes a rectifier coupled to the first capacitor and the second capacitor. The energy harvester also includes a first switch, a second switch, and a third switch. The first switch is coupled between the rectifier and the first capacitor. The second switch is coupled between the rectifier and the second capacitor, with the second capacitor coupled between the second switch and the power supply node. The third switch is coupled between the first capacitor and the power supply node.

In an example aspect, another method for operating a multi-capacitor energy harvester is disclosed. The method includes receiving a wireless signal and rectifying the wireless signal to produce a direct-current signal. The method also includes producing a first voltage at a first capacitor using the direct-current signal and monitoring the first voltage relative to a first voltage threshold. The method additionally includes providing the first voltage to a load based on the monitoring. The method further includes producing a second voltage at a second capacitor using the direct-current signal and based on the monitoring.

BRIEF DESCRIPTION OF DRAWINGS

FIG. 5-1 is a circuit diagram of the example energy harvester and energy storage of FIG. 4 in a first phase of operation.

FIG. 5-2 is a circuit diagram of the example energy harvester and energy storage of FIG. 4 in a second phase of operation.

FIG. 7-1 is a circuit diagram of the example energy harvester and energy storage of FIG. 6 in a first phase of operation.

FIG. 7-2 is a circuit diagram of the example energy harvester and energy storage of FIG. 6 in a second phase of operation.

FIG. 7-3 is a circuit diagram of the example energy harvester and energy storage of FIG. 6 in a third phase of operation.

FIGS. 8-1 to 8-3 are three graphs that illustrate example voltage levels of the circuit of FIG. 6 versus time for three different example received power levels.

DETAILED DESCRIPTION

Introduction and Overview

Figure 1:
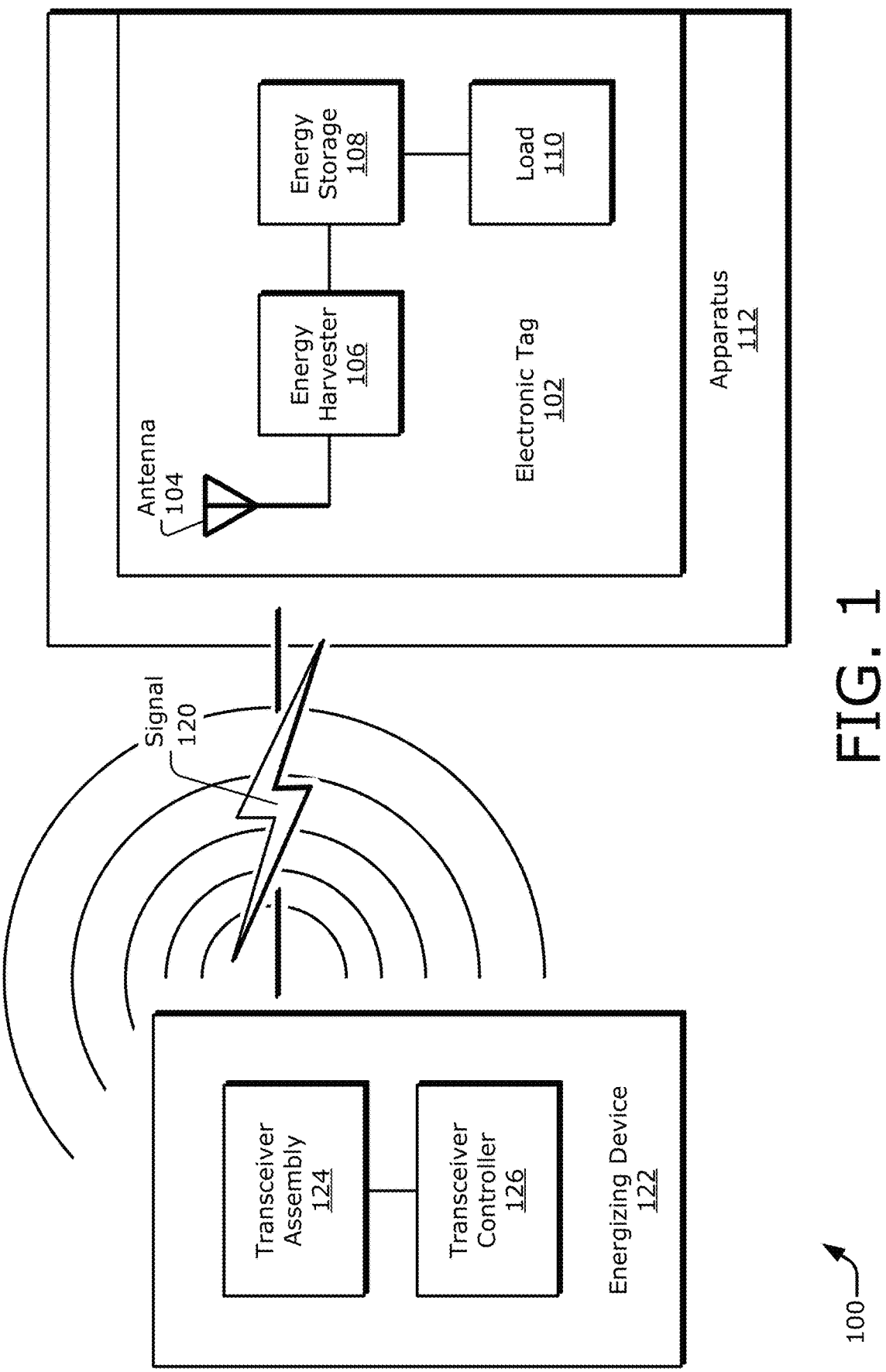
FIG. 1 illustrates an example environment with an energizing device and an example apparatus that can implement multi-capacitor energy harvesting.

Many uses of electronic tags entail obtaining data, retaining data, or communicating data. Some electronic tags are powered, at least partially, by wireless signals. Passive tags, for instance, omit a battery. Certain tags, such as passive tags or some rechargeable ones, can collect energy by receiving a wireless signal, like a radio-frequency (RF) signal, and then store the energy with a capacitor. The electronic tag can use the energy stored in the capacitor to power circuitry while the stored energy is gradually being depleted.

The received RF signal, however, may be suboptimal compared to a signal that would provide maximum power to an electronic tag. For example, an RF signal may not be received at an electronic tag with an amplitude that provides a minimum operational voltage for the circuitry of the tag. In such cases, the electronic tag may be incapable of providing any functionality because the storage capacitor fails to reach the minimum operational voltage. Additionally or alternatively, an electronic tag may not receive an RF signal with sufficient power to operate all specified circuitry for an appropriate time period of a targeted use case. In these situations, some functionality may be curtailed frequently, or all functionality may cease periodically while the capacitor receives additional charge to increase the current voltage level to a usable level.

To at least partially ameliorate these problems, this document describes example implementations for apparatuses that include at least two capacitors for energy storage in conjunction with energy harvesting. These implementations enable voltage scaling or energy preservation to counter the two problems discussed above. In some cases, the capacitors can have different capacitive sizes. For example, a first capacitor can be relatively larger than a second capacitor, or vice versa as described herein. The different capacitive sizes can be used to provide different charging or energy storage capabilities or features for an apparatus, such as an electronic tag.

As used herein, unless context dictates otherwise, a size of a capacitor refers to a capacitance of the capacitor. A physical size of two capacitors may differ, even if the two capacitors have a same or similar capacitance. The physical sizes of two capacitors can differ based on a capacitor type, a capacitor geometry, the materials with which the capacitor is constructed, whether physical size refers to an area or a volume of the capacitor, and so forth.

In some implementations, an energy harvester initially charges a relatively larger first capacitor to a first voltage level that is enabled by a given strength of a received RF signal. The energy harvester can use a first rectifier to charge the first capacitor based on the received RF signal. This first voltage level may not, however, be sufficient to power a load of an apparatus, such as the circuitry of an electronic tag. The energy harvester transfers stored charge from the larger first capacitor to a relatively smaller second capacitor to generate a higher, second voltage level. To perform the charge transfer, the energy harvester can use an oscillator, such as an inductive-capacitive (LC) oscillator, and a second rectifier.

Control circuitry can open and close one or more switches of the energy harvester to orchestrate the flow of energy. For example, the oscillator can receive a voltage from the first capacitor, and the second rectifier can receive an oscillating signal from the oscillator and provide a rectified signal to the second capacitor. The second voltage level at the second capacitor is sufficient to operate the circuitry of the electronic tag, even if the first voltage level is insufficient. Thus, the energy harvester can use two capacitors with two different capacitances to scale a voltage level that is made available to a load of an apparatus. This voltage scaling can enable the apparatus to function even if the RF signal is received at an amplitude that does not intrinsically provide a requisite minimum operational voltage level.

In other implementations, an energy harvester initially charges a relatively smaller first capacitor based on a received RF signal. After the first capacitor reaches a voltage level that is usable by a load of an apparatus, such as the circuitry of an electronic tag, the first capacitor can be used to power the circuitry. Meanwhile, a relatively larger second capacitor can then also be charged by the received RF signal. Once the second capacitor reaches at least the minimum operational voltage level for powering the circuitry, the larger capacitor can be coupled to the circuitry.

The energy harvester can switchably couple the two capacitors separately or jointly to the circuitry of the electronic tag based on a present (e.g., a current or contemporaneous) voltage level of each capacitor and the minimum operational voltage level of the circuitry. To do so, control circuitry can open and close one or more switches of the energy harvester. To determine a present capacitor voltage level, the energy harvester can employ at least one voltage monitor that is connected to a node that is coupled to a capacitor. Thus, at least one capacitor can be powering the circuitry for extended time periods to accommodate targeted use cases. With this shared charging and powering mechanism that provides charge preservation over time, the circuitry becomes usable for a greater proportion of time for a given RF signal.

In still other implementations, an efficient voltage monitor deploys at least one voltage detector having low leakage current. The voltage monitor can include multiple voltage level shifters that detect different voltage levels. Each level shifter is coupled in series with a latch between two nodes: a node having a voltage to monitored and a power distribution network node, such as a power supply node or a ground node. The monitored node may also serve as a power distribution network node. The latch includes multiple transistors that are arranged into a transistor circuit that can reduce current flow between the two nodes. For example, a transistor column of a pair of transistor columns includes transistors that are coupled together in series and that turn on or off in opposite manners in response to the same signal. Accordingly, if a first transistor of a transistor column is turned on, then a second transistor that is coupled in series with the first transistor is turned off. This reduces current flow and lowers leakage current to produce a more efficient voltage monitor, which can be used in an energy harvester. These and other implementations are described herein.

Description Examples

FIG. 1 illustrates an example environment 100 with an energizing device 122 and an example apparatus 112 that can implement multi-capacitor energy harvesting. As illustrated, the apparatus 112 can include or otherwise be associated with at least one electronic tag 102. The electronic tag 102 can include at least one antenna 104, at least one energy harvester 106, at least one instance of energy storage 108, and at least one load 110. As described below, the electronic tag 102 can be energized by or using a signal, such as a signal 120 emanating from the energizing device 122.

In example implementations, the electronic tag 102 is attached to or incorporated in the apparatus 112, such as by being affixed with an adhesive, by being physically connected with a fastener, or by being positioned within the apparatus 112. The electronic tag 102 may also be integrated as part of the apparatus 112. Alternatively, an apparatus 112 may include an antenna 104, an energy harvester 106, energy storage 108, and a load 110 without these components necessarily forming an electronic tag. For instance, a mobile device apparatus may include these components to enable a wireless transaction to be performed by the mobile device without drawing power from a battery of the mobile device. Generally, the apparatus 112 can be or comprise an electronic device, a good, an object, or some combination thereof.

As shown, the energizing device 122 can include at least one transceiver assembly 124 and at least one transceiver controller 126. The energizing device 122 can be any electronic device that generates a signal 120, such as a radio-frequency (RF) signal that forms an alternating-current (AC) signal. Examples of an energizing device 122 include an RFID reader, an inventory-management device, a wireless power transmitter, a tracking device, and so forth. In example operations of the energizing device 122, the transceiver assembly 124 transmits the signal 120 under the control of the transceiver controller 126. In some cases, the transceiver assembly 124 can receive a response from the apparatus 112. In other cases, the energizing device 122 provides a powering RF signal (and may transmit information or instructions), but the energizing device 122 may not receive or detect a response. In such situations, the energizing device 122 may include transmitter hardware (e.g., a transmitter assembly and a transmitter controller) but omit receiver hardware.

In example implementations of the apparatus 112, the antenna 104 is coupled to the energy harvester 106, and the energy harvester 106 is coupled to the energy storage 108. To enable the load 110 of the apparatus 112 to operate, the energy storage 108 is coupled to the load 110. Thus, the energy storage 108 can power the load 110. The load 110 may comprise electronic circuitry of an electronic tag 102 or of an apparatus 112 generally. As described herein and depicted in the accompanying figures, the energy harvester 106 and the energy storage 108 may not be completely or solely coupled together in series between the antenna 104 and the load 110. Instead, components of the energy harvester 106 and of the energy storage 108 may be intermingled in series and parallel manners to enable the techniques presented by this document.

In example operations, the antenna 104 receives the signal 120. The signal 120 may have a radio frequency, and the signal 120 may comprise an alternating-current signal (AC signal). The signal 120 carries energy, such as the electromagnetic (EM) energy of a propagating RF signal or EM wave. The energy harvester 106 collects at least a portion of this energy and provides the energy to the energy storage 108. The energy storage 108 can store the energy in the form of charge to produce a voltage potential or voltage level. Under the control of the energy harvester 106, the energy storage 108 can expose this energy to the load 110, and the load 110 can operate (e.g., perform processing tasks) while discharging the voltage potential. Examples of the load 110 and corresponding processing tasks are described next with reference to FIG. 2.

Figure 2:
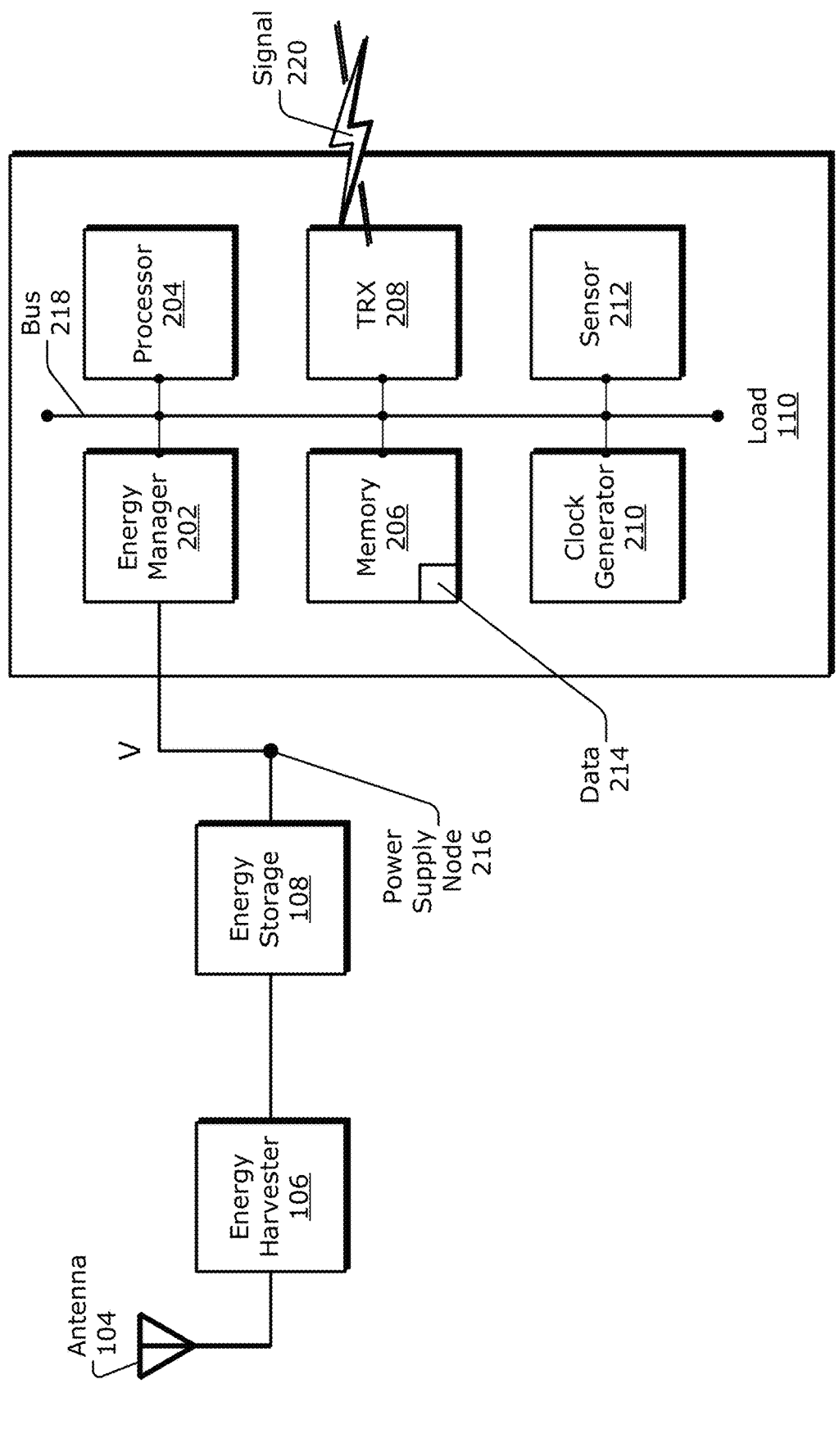
FIG. 2 is a schematic diagram of an example apparatus that can implement multi-capacitor energy harvesting with an energy harvester and energy storage.

FIG. 2 is a schematic diagram of an example apparatus 112 that can implement multi-capacitor energy harvesting with an energy harvester 106 and energy storage 108. As illustrated, the apparatus 112 can include at least one antenna 104, at least one energy harvester 106, at least one instance of energy storage 108, and at least one load 110. Although not explicitly shown in FIG. 2, these components can be part of an electronic tag 102 (e.g., of FIG. 1) instead of or in addition to a different apparatus 112.

In example implementations, the load 110 can be coupled to the energy storage 108 via at least one node, such as at least one power supply node 216 (or supply voltage node 216). Generally, at least a portion of an electronic apparatus, such as a circuit thereof, can be powered using a power distribution network that includes multiple nodes, such as multiple power distribution network nodes. A power distribution network can therefore include, for example, at least one power supply node (e.g., the power supply node 216), such as a power rail or a portion thereof, and at least one ground node, such as a ground plane or portion thereof. The energy storage 108 can provide a voltage (V), such as an output voltage, at the power supply node 216 to power the load 110. Generally, the energy storage 108 can be coupled to the load 110 via any power distribution network node.

As shown, the at least one load 110 can include any one or more of multiple components. Examples of these components include at least one energy manager 202, at least one processor 204, at least one memory 206, at least one transceiver 208 (TRX 208), at least one clock generator 210, and at least one sensor 212. A load 110 can, however, include more, fewer, or different components. Each of these components may form an individual load 110 or may be part of a combined, multi-component load 110. The load components are depicted as each being coupled to a common bus 218. The load components may, however, be coupled together in different manners, including directly without a bus or via another, non-bus component. For instance, the memory 206 or the sensor 212 may be coupled "behind" the processor 204 such that one or both lacks direct access to the bus 218 or the transceiver 208. In some cases, the energy manager 202 or the clock generator 210 may be coupled to multiple other components via a separate bus or line (e.g., via a power distribution network or a clock line).

In example operations, energy manager 202 may control access to the power supply node 216 for one or more other components of the load 110. The processor 204 can control other components of the load 110 based on programmed functionality as represented by processor-executable instructions, which may be stored at the memory 206. The memory 206 can include nonvolatile memory (e.g., flash memory) or volatile memory (e.g., random-access memory (RAM) such as dynamic RAM (DRAM) or static RAM (SRAM)). The memory 206 may store data 214. The data 214 can represent information that may be provided to another apparatus via the transceiver 208 using a signal 220. The information can include at least one identifier of an associated object. Identifiers can include a name of the object, an owner of the object, a destination for the object, and so forth. Other information can include a current location or a location history, sensor data from the sensor 212 (e.g., satellite positioning coordinates, temperatures, or accessible wireless networks) that is obtained over time, acceleration forces experienced by the object, information that has been wireless received by the load, and so forth.

If the apparatus 112 is to have transmit functionality (e.g., to transmit the signal 220) but not receive functionality with respect to data communication, the transceiver 208 can instead be implemented as a transmitter. If the apparatus 112 is to have receive functionality (e.g., to receive the signal 220) but not transmit functionality, the transceiver 208 can instead be implemented as a receiver. The transceiver 208 can also be implemented with a transmitter and a receiver. The transceiver 208 can be implemented with, for instance, a Bluetooth® radio or another low-energy system. The clock generator 210 can include, for example, an oscillator, a frequency-locked loop (FLL), a phase-locked loop (PLL), and so forth. Other example load components include a voltage limiter, a bias generator, a wakeup receiver, and so forth.

Figure 3:
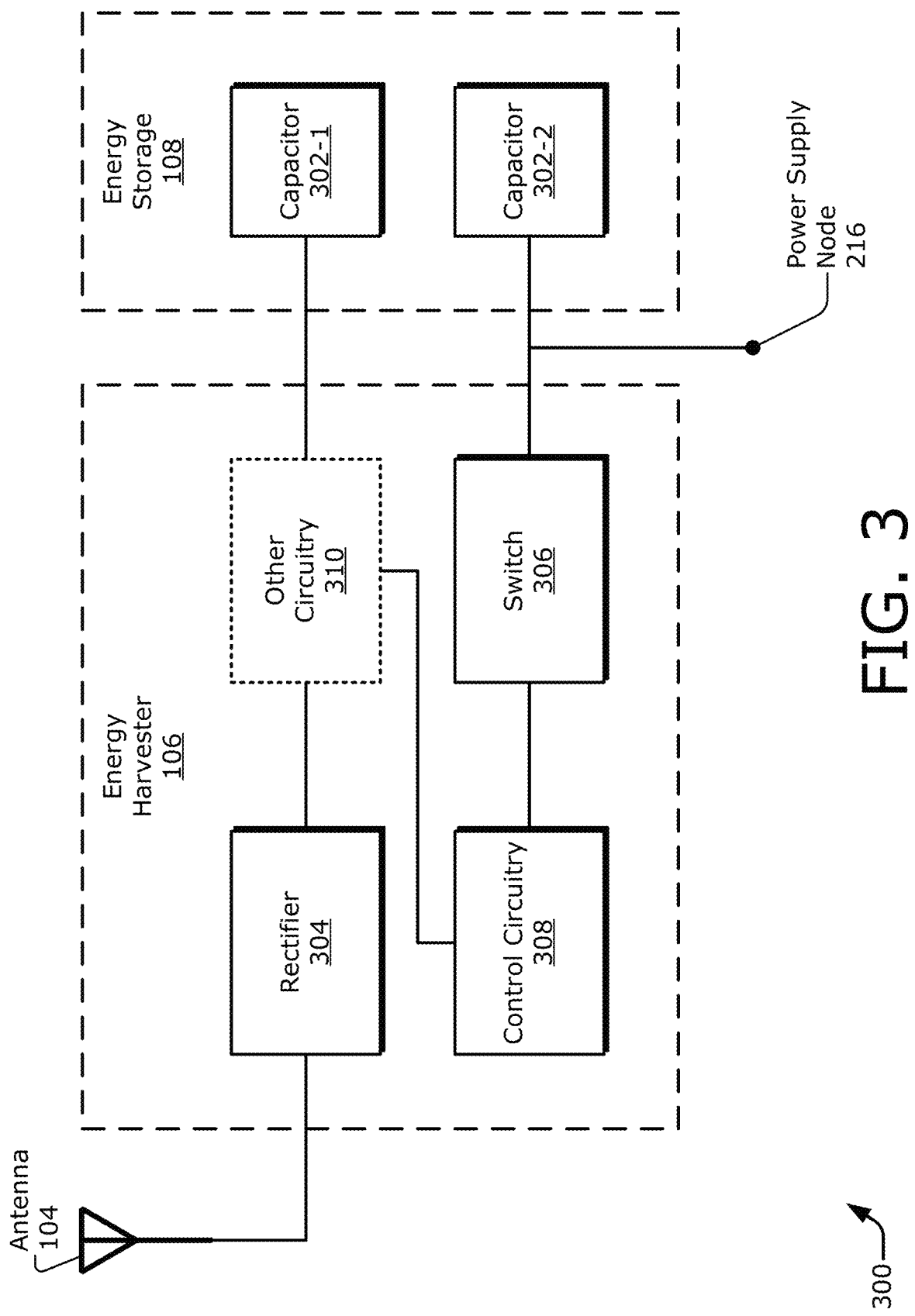
FIG. 3 is a schematic diagram of an example energy harvester and example energy storage.

FIG. 3 is a schematic diagram 300 of an example energy harvester 106 and example energy storage 108. As illustrated, the energy storage 108 includes multiple capacitors 302-1 ... 302-2, such as a first capacitor 302-1 and a second capacitor 302-2. The energy storage 108 may, however, include more than two capacitors or an alternative energy storage component. As shown, the energy harvester 106 includes at least one rectifier 304, at least one switch 306, at least one instance of control circuitry 308, and other circuitry 310. The energy harvester 106 may, however, include more, fewer, or different components.

In example implementations, the antenna 104 is coupled to the rectifier 304. Further, the power supply node 216 is coupled to a switch 306 or a capacitor 302, such as the second capacitor 302-2. Thus, the power supply node 216 may be coupled to the second capacitor 302-2 and the switch 306 in accordance with a permissible, but optional, "inclusive or" interpretation of the word "or." Examples of other circuitry 310 include at least one oscillator, at least one voltage monitor, one or more other rectifiers, one or more other switches, and so forth. The rectifier 304 can convert alternating current (AC) to direct current (DC) to produce unidirectional current flow. The rectifier 304 may be constructed from any components or realized in any manner. Example types of rectifiers that can be used to form a rectifier 304 include a half-wave rectifier, a full-wave rectifier, a bridge rectifier, a controlled or uncontrolled rectifier, a rectifier circuit with one or more diodes or with at least one transistor (or transformer), or a combination thereof.

The control circuitry 308 can control, for instance, a state of one or more switches based on a monitored voltage level from a node that is part of at least one of the energy harvester 106 or the energy storage 108. Each switch 306 can be in an open state or a closed state. Each switch 306 can be formed from at least one transistor. In some cases, a switch 306 can be formed using two transistors that are doped or biased in opposite manners and coupled together in parallel.

Generally, each switch 306 can be implemented with at least one transistor. The transistors may be realized with any one or more of multiple transistor types. Examples transistor types include a field effect transistor (FET), a junction FET (JFET), a metal-oxide-semiconductor FET (MOSFET), a bipolar junction transistor (BJT), an insulated-gate bipolar transistor (IGBT), and so forth. Manufacturers may fabricate FETs as n-channel or p-channel transistor types and may fabricate BJTs as NPN or PNP transistor types.

Each transistor may include at least one control terminal and one or more channel terminals. With an FET transistor, a control terminal can correspond to a gate terminal, and a channel terminal can correspond to a source terminal or a drain terminal. With a BJT transistor, a control terminal can correspond to a base terminal, and a channel terminal can correspond to an emitter terminal or a collector terminal. The control circuitry 308 can control a state (e.g., an open or off state versus a closed or on state) of a transistor switch using the control terminal. For example, to open a p-channel MOSFET switch (to turn off the transistor to prevent current flow), the control circuitry 308 provides a high voltage, such as a high voltage control signal, to the gate terminal of the p-channel MOSFET. To close the p-channel MOSFET switch (to turn on the transistor to permit current to flow), the control circuitry 308 provides a low voltage, such as a low voltage control signal, to the gate terminal of the p-channel MOSFET. The state of a switch 306 that is formed with an n-channel MOSFET can be open or closed using opposite voltages—e.g., a low voltage control signal opens the n-channel MOSFET switch (to turn the transistor off to prevent current from flowing) and a high voltage control signal closes the n-channel MOSFET switch (to turn the transistor on to enable current to flow).

Although the components depicted in FIG. 3 are shown as being coupled together in specific manners, these are for illustration purposes only. The depicted and other components of an energy harvester 106 or energy storage 108 may be coupled together in different manners. Example implementations that couple these and other components together to realize multi-capacitor energy harvesting are described herein and depicted in other figures in addition to FIG. 3.

As described above with reference to FIG. 1, an apparatus 112 can comprise an electronic tag 102. With reference jointly to FIGS. 1-3, the electronic tag 102 can include a transmitter (e.g., as at least part of the transceiver 208) coupled to a second capacitor 302-2, such as via a power supply node 216. A processor 204 can be coupled to the transmitter via at least one wire, such as a wire of the bus 218, and coupled to the second capacitor 302-2, such as via the power supply node 216. In an example operation, the processor 204 can cause the transmitter to transmit a signal 220 that includes data 214 that identifies at least one object associated with the electronic tag 102.

Figure 4:
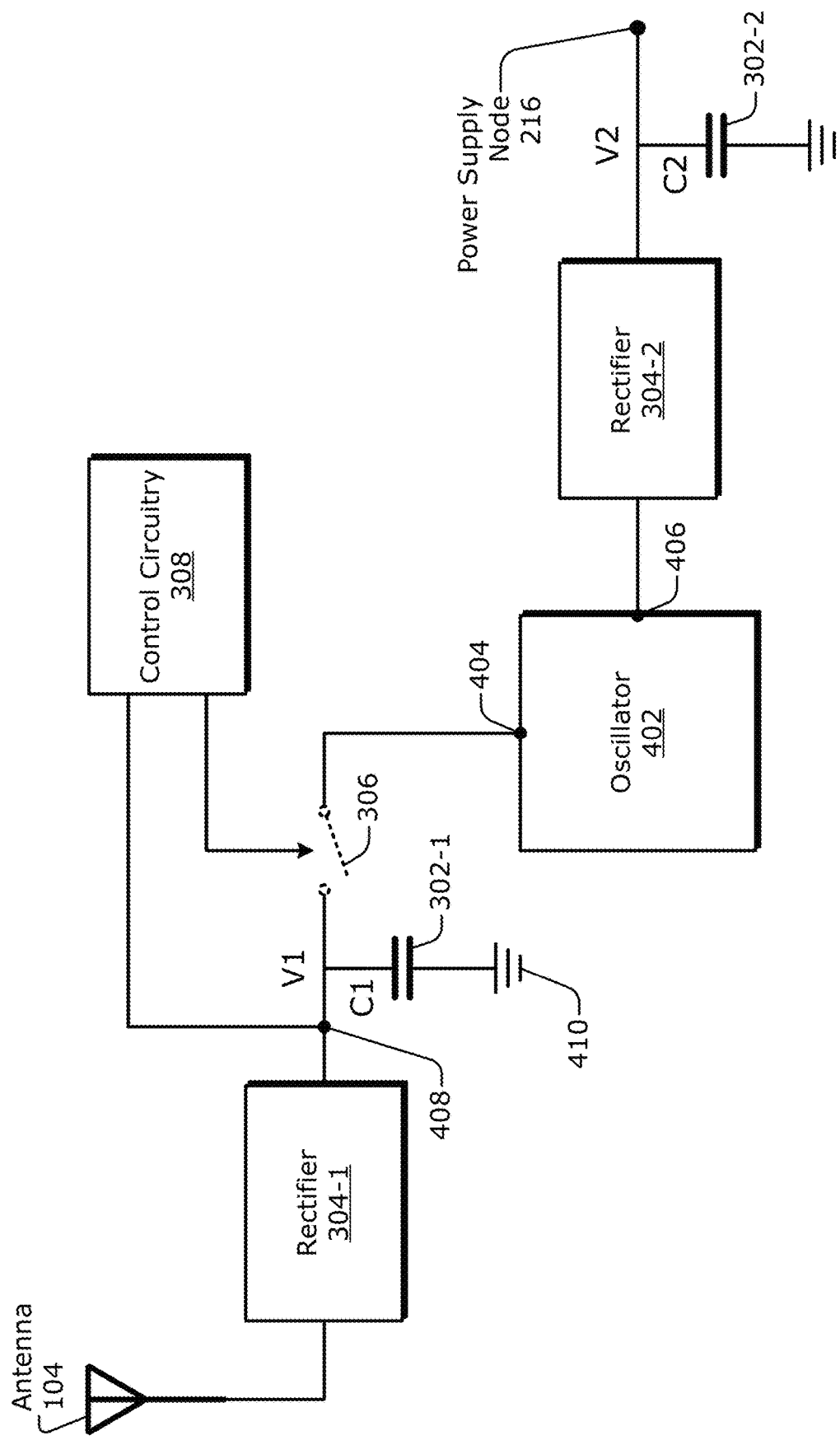
FIG. 4 is a circuit diagram of an example energy harvester including at least one oscillator and multiple rectifiers and of example energy storage including multiple capacitors.

FIG. 4 is a circuit diagram 400 of an example energy harvester including at least one oscillator 402 and multiple rectifiers 304-1 ... 304-2 and of example energy storage including multiple capacitors 302-1 ... 302-2. As illustrated, an energy harvester 106 (e.g., of FIG. 3) can include a first rectifier 304-1, a second rectifier 304-2, at least one switch 306, control circuitry 308, and at least one oscillator 402. Energy storage 108 (e.g., of FIG. 3) can include a first capacitor 302-1 (C1) and a second capacitor 302-2 (C2). These components are coupled together between at least one antenna 104 and at least one power supply node 216.

In example implementations, the first rectifier 304-1 is coupled to the first capacitor 302-1 via an output (e.g., an output terminal) of the first rectifier 304-1. The oscillator 402 includes an input 404 and an output 406. The input 404 is coupled to the first capacitor 302-1. The second rectifier 304-2 is coupled between the output 406 of the oscillator 402 and the second capacitor 302-2. An input of the second rectifier 304-2 is coupled to the output 406 of the oscillator 402, and an output of the second rectifier 304-2 is coupled to the second capacitor 302-2. Each capacitor 302 may be coupled between a node and a power distribution network node, such as a ground 410. For example, the first capacitor 302-1 is coupled between a node 408 and the ground 410. The second capacitor 302-2 is coupled between the power supply node 216 and the ground 410.

The first capacitor 302-1 has a first capacitance that is greater than a second capacitance of the second capacitor 302-2. For example, the first capacitance can be 25% greater, 50% greater, 100% greater (i.e., double or two times greater), five times greater, ten times greater (i.e., an order of magnitude greater), 20 times greater, 100 times greater (i.e., two orders of magnitude greater), or more greater than the second capacitance. Thus, the first capacitance of the first capacitor 302-1 may be at least ten times greater than the second capacitance of the second capacitor 302-2. The relative capacitive sizes between two or more of the capacitors may, however, be different.

In some implementations, the first capacitor 302-1 is coupled between an output of the first rectifier 304-1 and the input 404 of the oscillator 402. For instance, a terminal (e.g., a first terminal) of the first capacitor 302-1 may be connected to a node (e.g., the node 408) that is coupled between the output of the first rectifier 304-1 and the input 404 of the oscillator 402. Another terminal (e.g., a second terminal) of the first capacitor 302-1 may be connected to the ground 410. The illustrated switch 306 of the energy harvester is coupled between the first capacitor 302-1 and the input 404 of the oscillator 402.

The switch 306 can be used to control if (and when) charge from the first capacitor 302-1 is exposed to the oscillator 402. The oscillator 402 can be constructed from any components or realized in any manner. Example types of oscillators that can be used to form an oscillator 402 include an inductive-capacitive (LC) oscillator, a ring oscillator, a relaxation oscillator, or a combination thereof. With an LC oscillator for instance, an inductor and a capacitor can be coupled together in parallel between two cross-coupled transistors. The input 404 of the oscillator 402 may correspond to a midpoint tap of the inductor. The output 406 of the oscillator 402 may correspond to two nodes: a channel terminal of each transistor of the two cross-coupled transistors. An oscillator 402, however, can be formed from a different oscillator type or can be coupled to other parts of the energy harvester or energy storage in various manners.

As shown, the control circuitry 308 can be coupled to the node 408 and a control terminal of the switch 306. The control circuitry 308 can control a state of a switch (e.g., an open state versus a closed state) using a control terminal of the switch. In the drawings, a dashed-line switch represents that a present state of the depicted switch is not particularly relevant to the figure. A solid-line switch, on the other hand, represents that an indicated present state of the switch may be relevant to a phase or operation of a circuit that is being depicted and described. The control circuitry 308 may include a voltage monitor to determine or detect a present voltage level at a node, such as a first voltage (V1) at the node 408. A voltage monitor is explicitly depicted in FIG. 6 as being part of an energy harvester and example operations are described below. Additional example aspects of a voltage monitor are described below with reference to FIG. 9.

If the control circuitry 308 includes a voltage monitor, the voltage monitor can be connected to the node 408, which is coupled between the output of the first rectifier 304-1 and the input 404 of the oscillator 402. The voltage monitor may be configured to detect a voltage at the node 408. Here, the detected voltage corresponds to the first voltage level (V1) of the first capacitor 302-1. The switch 306 can be opened or closed based on the voltage at the node 408. The oscillator 402 can transfer charge from the first capacitor 302-1 to the second capacitor 302-2 responsive to the switch 306 being in a closed state. This closed state is described below with reference to FIG. 5-2. The open state of the switch 306, however, is described next with reference to FIG. 5-1.

Figures 1, 5:
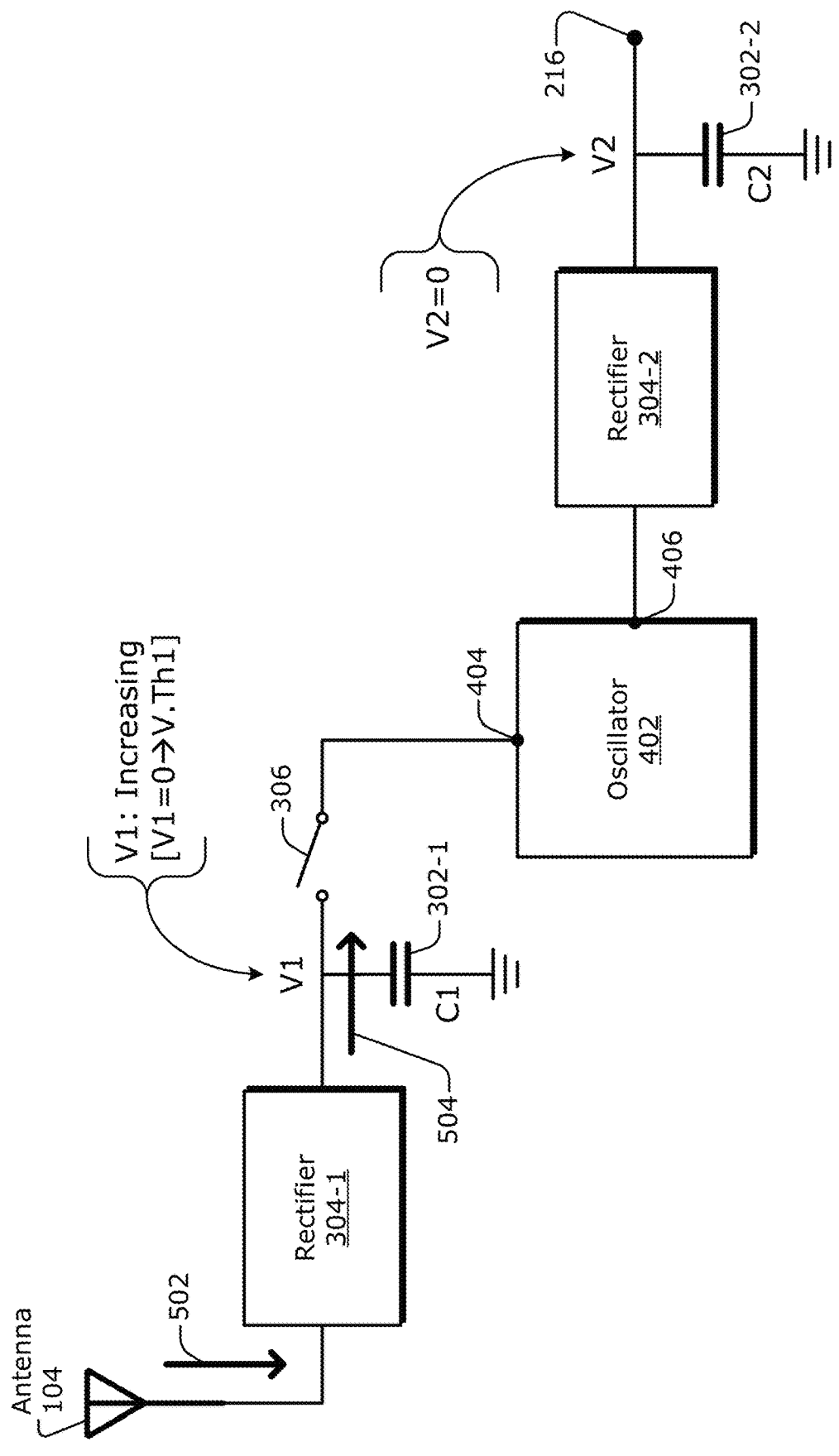
Figures 2, 5:
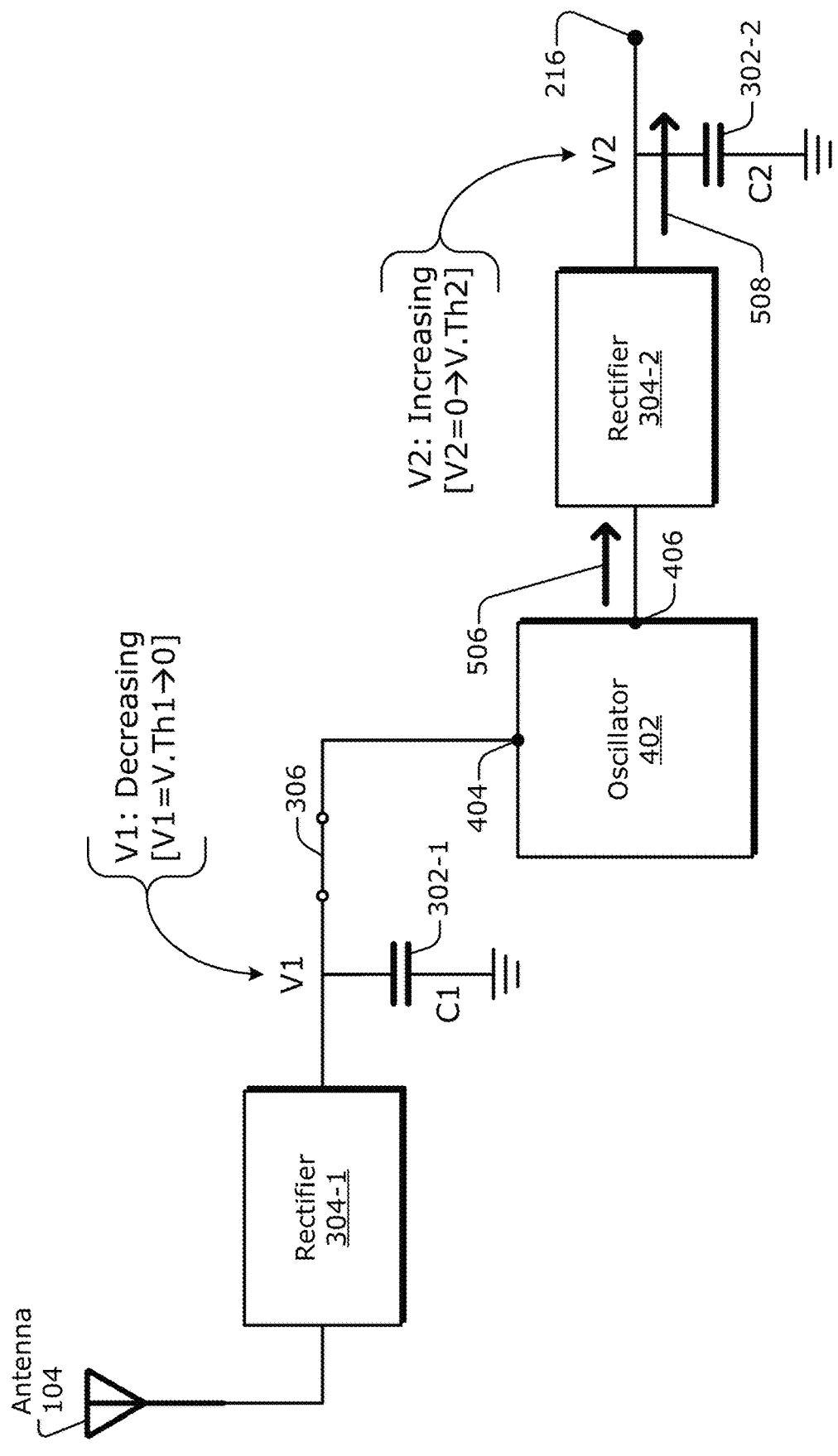

FIG. 5-1 is a circuit diagram 500-1 of the example energy harvester and energy storage of FIG. 4 in a first phase of operation. The first phase of operation corresponds to a first time (t=t.1). FIG. 5-2 is a circuit diagram 500-2 of the example energy harvester and energy storage of FIG. 4 in a second phase of operation. The second phase of operation corresponds to a second time (t=t.2) that can occur after the first time (t=t.1). Generally, the oscillator 402 is configured to transfer charge from the first capacitor 302-1 to the second capacitor 302-2. The charge is therefore transferred from the first capacitor 302-1 having the first capacitance to the second capacitor 302-2 having the second capacitance that is less than the first capacitance. By transferring a given amount of charge from a relatively larger capacitor to a relatively smaller capacitor, a voltage at the relatively smaller capacitor is greater than another voltage at the relatively larger capacitor. Thus, the second voltage (V2) at the second capacitor 302-2 can be greater than the first voltage (V1) at the first capacitor 302-1. This enables a load to operate even if the received signal intrinsically provides less power than a minimum voltage threshold for the load.

As shown in FIG. 5-1, the switch 306 is in an open state such that the first capacitor 302-1 can be charged. Initially, the second voltage (V2) at the second capacitor 302-2 may be at zero volts (0 V). In example operations, the antenna 104 receives an alternating-current signal 502 (AC signal 502). With the antenna 104 coupled to an input of the first rectifier 304-1, the first rectifier 304-1 accepts the alternating-current signal 502 from the antenna 104 and rectifies the alternating-current signal 502 to provide a first direct-current signal 504 to the first capacitor 302-1 to generate the first voltage (V1) at the first capacitor 302-1.

The first voltage (V1) is therefore increasing from a lower voltage (e.g., zero (0) volts) to a higher voltage. The higher voltage can be implemented as a first voltage threshold (V.Th1). Responsive to the first voltage (V1) reaching the first voltage threshold (V.Th1), the switch 306 can be closed. The control circuitry 308 (of FIG. 4) can monitor the first voltage (V1) with a voltage monitor and close the switch 306 based on the first voltage (V1)—e.g., responsive to the first voltage (V1) reaching the first voltage threshold (V.Th1).

Continuing with reference to FIG. 5-2, the switch 306 is in a closed state. The oscillator 402 generates an oscillating signal 506 at the output 406 of the oscillator 402 based on accepting the first voltage (V1) from the first capacitor 302-1 at the input 404 of the oscillator 402. The second rectifier 304-2 accepts the oscillating signal 506 from the output 406 of the oscillator 402 at the input of the second rectifier 304-2. The second rectifier 304-2 rectifies the oscillating signal 506 to provide a second direct-current signal 508 to the second capacitor 302-2 via the output of the second rectifier 304-2 to generate a second voltage (V2) at the second capacitor 302-2.

With the switch 306 being closed, the oscillator 402 can reduce the first voltage (V1) of the first capacitor 302-1 and increase the second voltage (V2) of the second capacitor 302-2 by transferring the charge from the first capacitor 302-1 to the second capacitor 302-2. Accordingly, the second voltage (V2) can increase from a lower voltage (e.g., zero volts) to a higher voltage, such as to a second voltage threshold (V.Th2). The second voltage threshold can be sufficiently high to enable an electronic load of an apparatus to function. In such cases, the second voltage threshold (V.Th2) can be greater than the first voltage threshold (V.Th1), such as by a factor of 2, 3, 4, or more.

Although not shown, another switch can be coupled between the second capacitor 302-2 and the power supply node 216. Responsive to the second voltage (V2) reaching (e.g., equaling or exceeding) the second voltage threshold (V.Th2), this switch can be closed to power the load. The control circuitry 308 of FIG. 4 can include another voltage monitor that controls operation of this switch. Meanwhile, responsive to the first voltage (V1) of the first capacitor 302-1 reaching (e.g., equaling or falling below) another voltage threshold (e.g., a third voltage threshold, which is lower than the first voltage threshold (V.Th1) and may be zero volts), the control circuitry 308 can open the switch 306 to recharge the first capacitor 302-1.

In example aspects, during a charging and powering operation, a first level of the first voltage (V1) of the first capacitor 302-1 is less than a second level of the second voltage (V2) of the second capacitor 302-2. Here, the first level of the first voltage (V1) corresponds to a first time (e.g., at time=t.1 of FIG. 5-1) before the oscillator 402 starts transferring the charge from the first capacitor 302-1 to the second capacitor 302-2. The second level of the second voltage (V2) corresponds to a second time (e.g., at time=t.2) after the oscillator 402 starts transferring the charge from the first capacitor 302-1 to the second capacitor 302-2.

Figure 6:
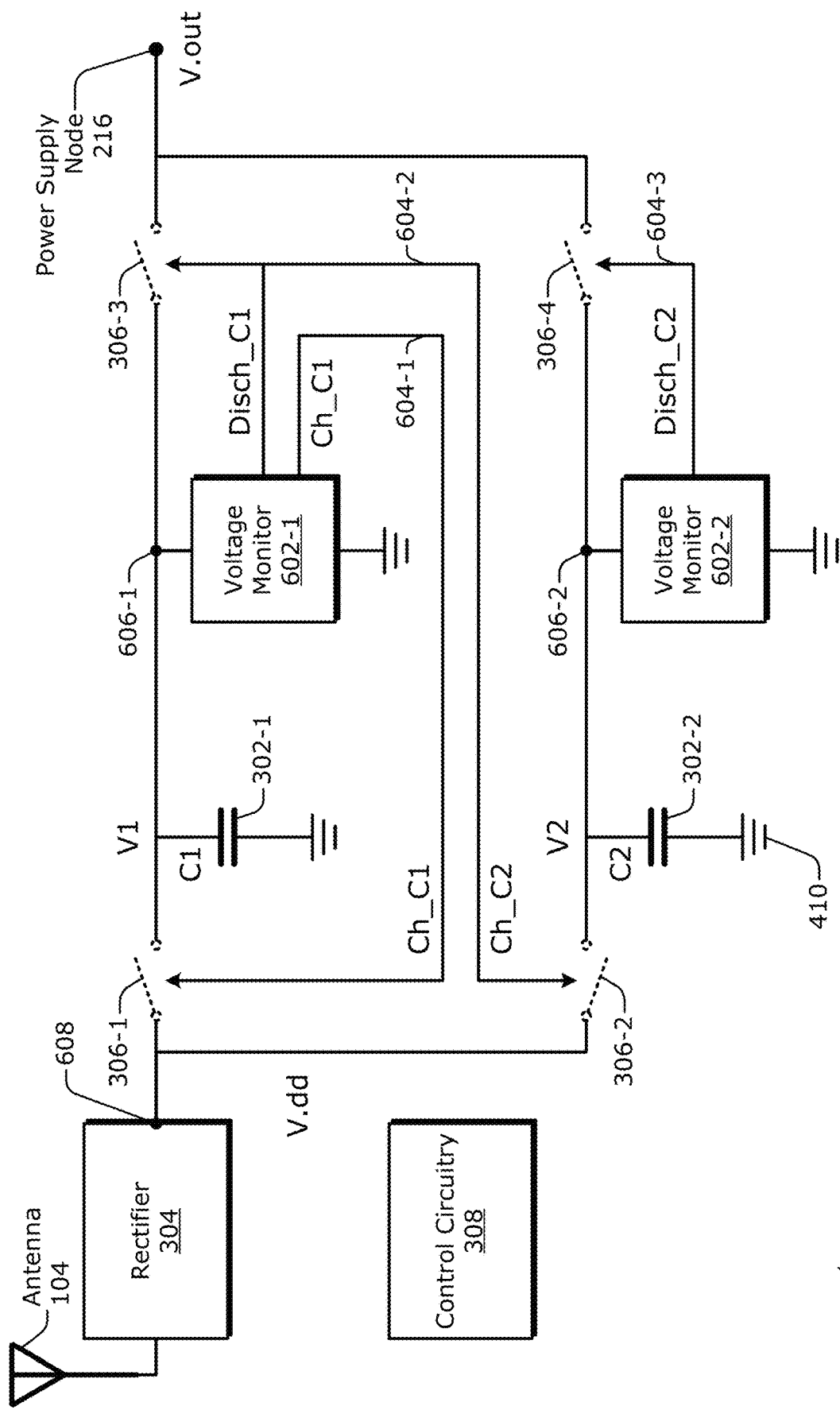
FIG. 6 is a circuit diagram of an example energy harvester including multiple voltage monitors and of example energy storage including multiple capacitors.

FIG. 6 is a circuit diagram 600 of an example energy harvester including multiple voltage monitors 602-1 . . . 602-2 and of example energy storage including multiple capacitors 302-1 . . . 302-2. As illustrated, the circuit diagram 600 includes at least one antenna 104; a power supply node 216; two or more capacitors 302-1 and 302-2; at least one rectifier 304; two or more switches 306-1, 306-2, 306-3, and 306-4; and control circuitry 308. The circuit diagram 600 also includes two or more voltage monitors 602-1 and 602-2; multiple control signals 604-1, 604-2, and 604-3; and two or more nodes 606-1 and 606-2.

In example implementations of FIG. 6, the energy storage 108 (e.g., of FIG. 3) can include the first capacitor 302-1 (C1) and the second capacitor 302-2 (C2). The energy storage 108 can, however, include more capacitors or other energy storage components. The energy harvester 106 can include the rectifier 304, the multiple switches 306-1 . . . 306-4, the control circuitry 308, and the multiple voltage monitors 602-1 . . . 602-2. An energy harvester 106 can, however, include fewer, more, or different components.

An output 608 of the rectifier 304 is coupled to the first capacitor 302-1 and the second capacitor 302-2. The output 608 of the rectifier 304 is also labeled with the input voltage (V.dd). The first switch 306-1 is coupled between the output 608 of the rectifier 304 and the first capacitor 302-1. The second switch 306-2 is coupled between the output of the rectifier 304 and the second capacitor 302-2. The second capacitor 302-2 is coupled between the second switch 306-2 and the power supply node 216, which is also labeled as the output voltage (V.out). For instance, the second capacitor 302-2 can be connected to a node (e.g., the second node 606-2) that is coupled between the second switch 306-2 and the power supply node 216. The third switch 306-3 is coupled between the first capacitor 302-1 and the power supply node 216. The fourth switch 306-4 is coupled between the second capacitor 302-2 and the power supply node 216.

The first voltage monitor 602-1 is connected to a first node 606-1 that is coupled between the first switch 306-1 and the third switch 306-3. The second voltage monitor 602-2 is connected to a second node 606-2 that is coupled between the second switch 306-2 and the fourth switch 306-4. To control the states (e.g., an open state or a closed state) of the switches, the voltage monitors can be coupled to control terminals of the switches. For example, the first voltage monitor 602-1 can be coupled to a first control terminal of the first switch 306-1 and a second control terminal of the second switch 306-2 to control when the rectifier 304 is capable of providing charge to the first capacitor 302-1 and the second capacitor 302-2, respectively.

The first voltage monitor 602-1 can also be coupled to a third control terminal of the third switch 306-3 to control when the first capacitor 302-1 is capable of providing current to the power supply node 216. The second voltage monitor 602-2 can be coupled to a fourth control terminal of the fourth switch 306-4 to control when the second capacitor 302-2 is capable of providing current to the power supply node 216. To control states of these four switches, the first and second voltage monitors 602-1 and 602-2 can provide control signals 604-1, 604-2, and 604-3 to the multiple switches 306-1 to 306-4.

The control circuitry 308 of the energy harvester can operate the first switch 306-1 and the second switch 306-2 with the first voltage monitor 602-1 to use the rectifier 304 to charge the first capacitor 302-1 to a first voltage threshold before using the rectifier 304 to charge the second capacitor 302-2. This is described below with reference to FIGS. 7-1 and 7-2. The control circuitry 308 of the energy harvester can also operate the fourth switch 306-4 with the second voltage monitor 602-2 to connect the second capacitor 302-2 to the power supply node 216 responsive to the second capacitor 302-2 reaching a second voltage threshold. This is described below with reference to FIGS. 7-2 and 7-3.

In example operations, the first and second voltage monitors 602-1 and 602-2 can control the states of the multiple switches 306-1 to 306-4 using the control signals 604-1, 604-2, and 604-3. The first voltage monitor 602-1 is connected to the first node 606-1 that is coupled between the first switch 306-1 and the third switch 306-3. The first voltage monitor 602-1 is also coupled to a first control terminal of the first switch 302-1. For instance, the first voltage monitor 602-1 can be coupled to a control terminal, such as a gate terminal or a base terminal, of a transistor, such as an FET or a BJT. The first voltage monitor 602-1 monitors a first voltage (V1) of the first capacitor 302-1 via the first node 606-1 and generates a first control signal 604-1 (a C1 charging signal, or "Ch_C1") based on the first voltage (V1). The first voltage monitor 602-1 also provides the first control signal 604-1 to the first control terminal of the first switch 306-1. This enables the first voltage monitor 602-1 to control when the rectifier 304 can provide charge to the first capacitor 302-1.

The first voltage monitor 602-1 is also coupled to a second control terminal of the second switch 306-2 and a third control terminal of the third switch 306-3. The first voltage monitor 602-1 generates a second control signal 604-2 (a C2 charging signal, or "Ch_C2," or a C1 discharging signal, or "Disch_C1") based on the first voltage (V1). The first voltage monitor 602-1 provides the second control signal 604-2 to the second control terminal of the second switch 306-2 and the third control terminal of the third switch 306-3. This enables the first voltage monitor 602-1 to control when the rectifier 304 can provide charge to the second capacitor 302-2. This also enables the first voltage monitor 602-1 to control when the first capacitor 302-1 can provide stored charge to the power supply node 216, and thus current to the load 110 (e.g., of FIGS. 1 and 2).

The second voltage monitor 602-2 is connected to the second node 606-2 that is coupled between the second switch 306-2 and the fourth switch 306-4. The second voltage monitor 602-2 is also coupled to a fourth control terminal of the fourth switch 306-4. In operation, the second voltage monitor 602-2 monitors a second voltage (V2) of the second capacitor 302-2 via the second node 606-2. The second voltage monitor 602-2 generates a third control signal 604-3 (a C2 discharging signal, or "Disch_C2") based on the second voltage (V2). The second voltage monitor 602-2 provides the third control signal 604-3 to the fourth control terminal of the fourth switch 306-4. This enables the second voltage monitor 602-2 to control when the second capacitor 302-2 can provide stored charge to the power supply node 216, and thus current to the load 110 (e.g., of FIGS. 1 and 2).

In some implementations for FIG. 6, the first capacitor 302-1 has a first capacitance that is less than a second capacitance of the second capacitor 302-2. For example, the second capacitance can be 25% greater, 50% greater, 100% greater (i.e., double or two times greater), five times greater, ten times greater (i.e., an order of magnitude greater), 20 times greater, 100 times greater (i.e., two orders of magnitude greater), or more greater than the first capacitance. Thus, the second capacitance of the second capacitor 302-2 may be at least ten times greater than the first capacitance of the first capacitor 302-1. The relative capacitive sizes of the capacitors may, however, be different.

These size differences enable the first capacitor 302-1 to reach a minimum operational voltage threshold faster than the second capacitor 302-2. The first capacitor 302-1 can therefore be used more quickly to power the load. Meanwhile, the second capacitor 302-2 can start to receive charge and will eventually reach the minimum operational voltage threshold, too. At this point, the second capacitor 302-2 can also be used to power the load. The two capacitors can alternate powering the load with or without temporal overlap between them. This is described further with reference to FIGS. 7-1 to 8-3.

Figures 1, 7:
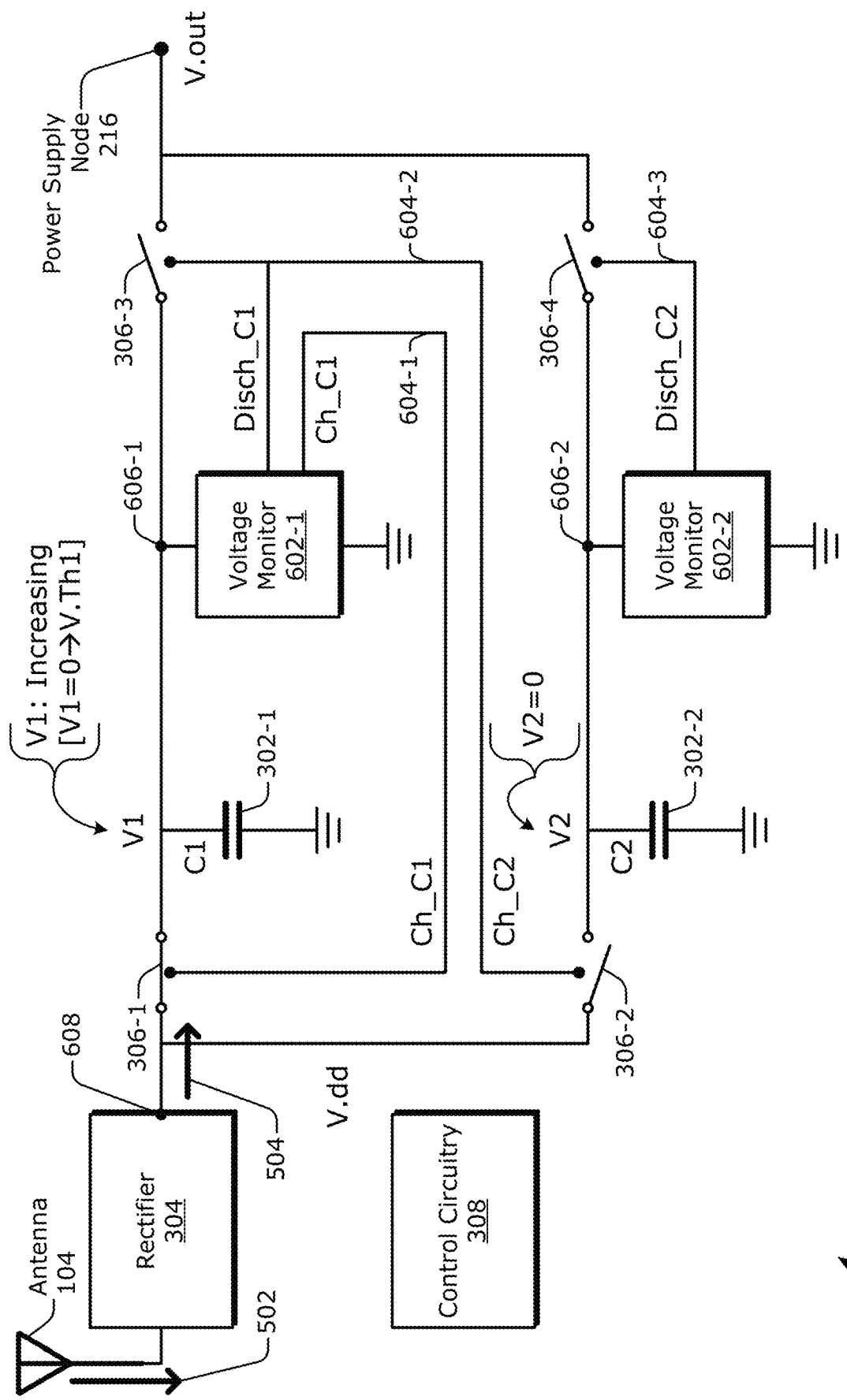
Figures 2, 7:
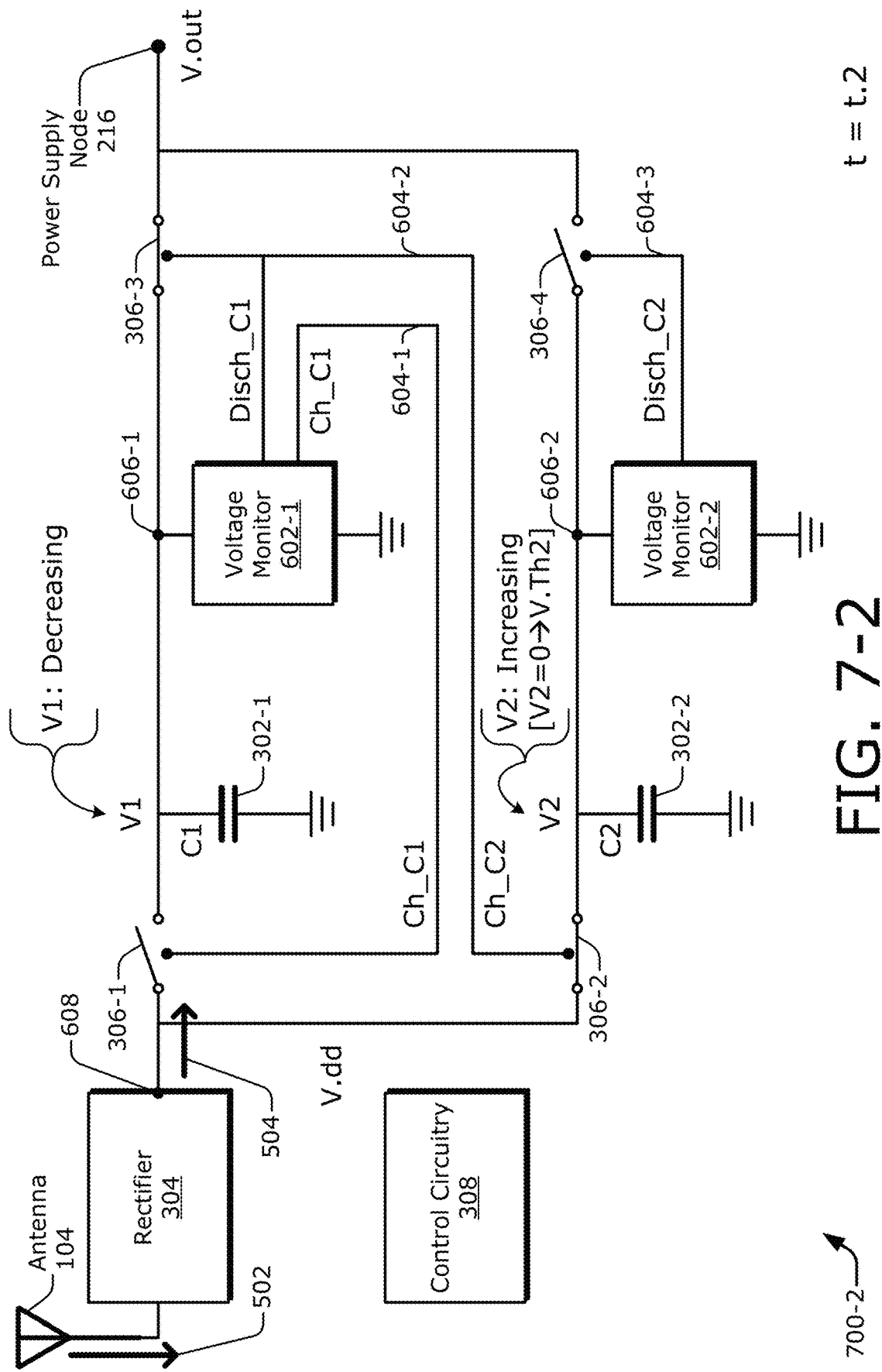
Figures 3, 7:
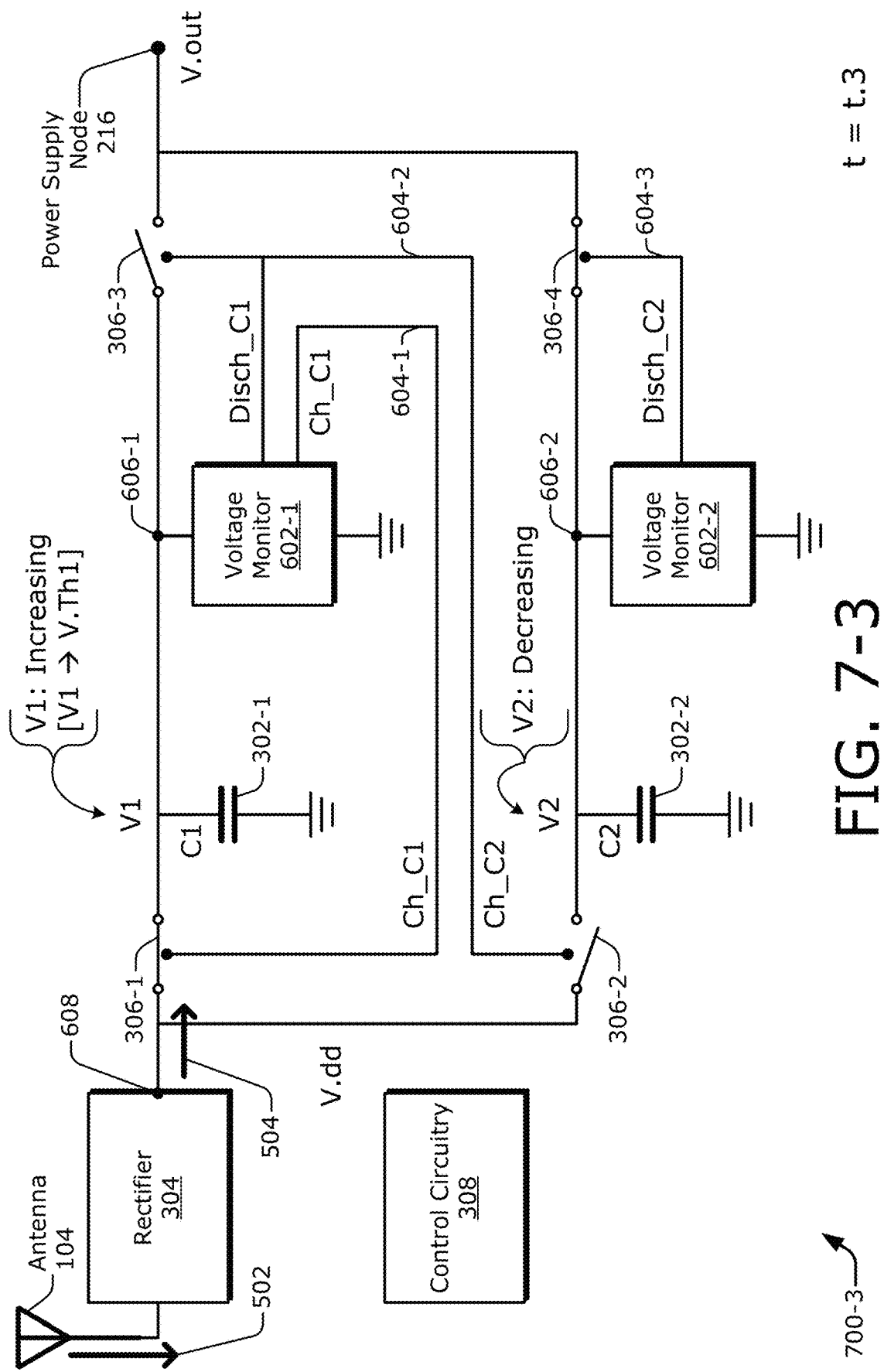

FIG. 7-1 is a circuit diagram 700-1 of the example energy harvester and energy storage of FIG. 6 in a first phase of operation (t=t.1). In the first phase, the first switch 306-1 is in a closed state, but the second, third, and fourth switches 306-2, 306-3, and 306-4 are in an open state. Here, the second voltage (V2) at the second capacitor 302-2 may be zero volts (0 V). With the output of the rectifier 304 electrically connected to the first capacitor 302-1, charge starts to build on the first capacitor 302-1. Accordingly, the first voltage (V1) begins to increase. The first voltage monitor 602-1 monitors the first voltage (V1) via the first node 606-1. Responsive to the first voltage (V1) reaching (e.g., equaling or exceeding) a first voltage threshold (V.Th1), the first voltage monitor 602-1 can use the first control signal 604-1 to open the first switch 306-1, which is described next with reference to FIG. 7-1.

FIG. 7-2 is a circuit diagram 700-2 of the example energy harvester and energy storage of FIG. 6 in a second phase of operation (t=t.2). In addition to opening the first switch 306-1 responsive to the first voltage (V1) reaching the first voltage threshold (V.Th1), the first voltage monitor 602-1 can use the second control signal 604-2 to close the second switch 306-2 and the third switch 306-3 as shown. In this second phase, the first voltage (V1) is decreasing as the charge stored at the first capacitor 302-1 is used to power the load via the power supply node 216 with the third switch 306-3 being closed. Meanwhile, with the second switch 306-2 being closed and the fourth switch 306-4 being open, charge is building at the second capacitor 302-2 to increase the second voltage (V2) from the direct-current signal 504 being output by the rectifier 304.

The second voltage monitor 602-2 monitors the second voltage (V2) via the second node 606-2. Responsive to the second voltage (V2) reaching (e.g., equaling or exceeding) a second voltage threshold (V.Th2), the second voltage monitor 602-2 can use the third control signal 604-3 to close the fourth switch 306-4, which phase is described below with reference to FIG. 7-3. The first voltage threshold (V.Th1) and the second voltage threshold (V.Th2) may be equal. Before the second voltage (V2) reaches the second voltage threshold (V.Th2), however, the first voltage (V1) may fall below a minimum or usable operational voltage threshold for powering the load. If this occurs, as detected by the first voltage monitor 602-1, the first voltage monitor 602-1 can "revert" the states of the first, second, and third switches 306-1, 306-2, and 306-3 to those shown in FIG. 1 until the first voltage (V1) again reaches the first voltage threshold (V.Th1). Accordingly, the first and second phases of FIGS. 7-1 and 7-2, respectively, may cycle back-and-forth multiple times until the second voltage (V2) reaches the second voltage threshold (V.Th2), which corresponds to the third phase of FIG. 7-3.

FIG. 7-3 is a circuit diagram 700-3 of the example energy harvester and energy storage of FIG. 6 in a third phase of operation (t=t.3). In this third phase, two switches are closed—the first and fourth switches 306-1 and 306-4, and two switches are open—the second and third switches 306-2 and 306-3. The second voltage (V2) is decreasing as the charge stored at the second capacitor 302-2 is used to power the load via the power supply node 216 with the fourth switch 306-4 being in a closed state. Meanwhile, with the first switch 306-1 being closed and the third switch 306-3 being open, charge is building again at the first capacitor 302-1 to increase the first voltage (V1) from the direct-current signal 504 being output by the rectifier 304.

The first voltage monitor 602-1 can flip the states of the first, second, or third switches 306-1, 306-2, or 306-3 responsive to the first voltage (V1) reaching the first voltage threshold (V.Th1) again. The second voltage monitor 602-2 can control the state of the fourth switch 604-3 independently of operations of the first voltage monitor 602-1 or dependently of these operations based on the control overlay provided by the control circuitry 308. If the capacitance of the second capacitor 302-2 is greater than the capacitance of the first capacitor 302-1, the second voltage (V2) decreases more slowly than the first voltage (V1) for a same current draw by the load via the power supply node 216. Example timings, voltage levels, and control signals are described next with reference to FIGS. 8-1 to 8-3.

Figures 1, 8:
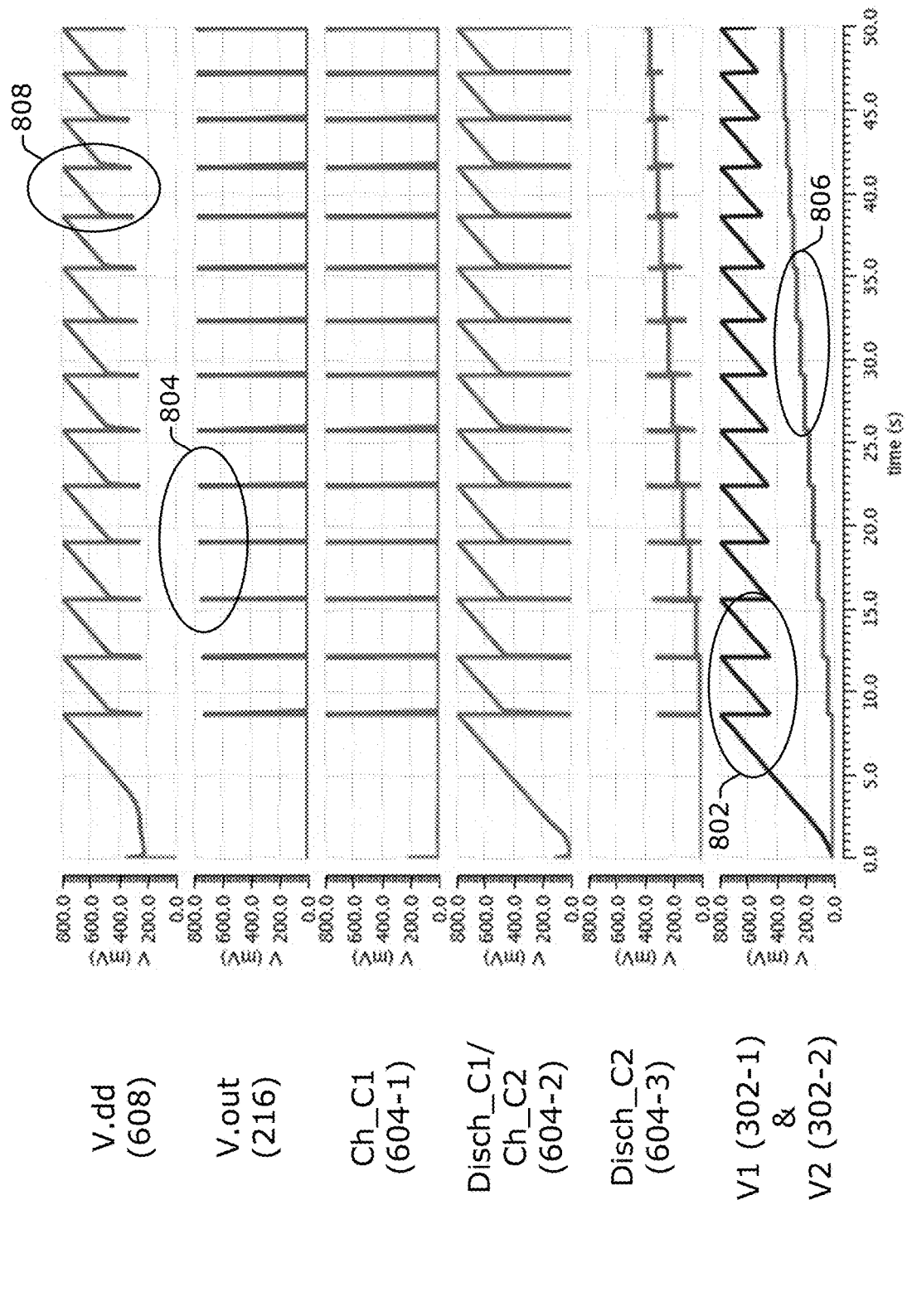
Figures 2, 8:
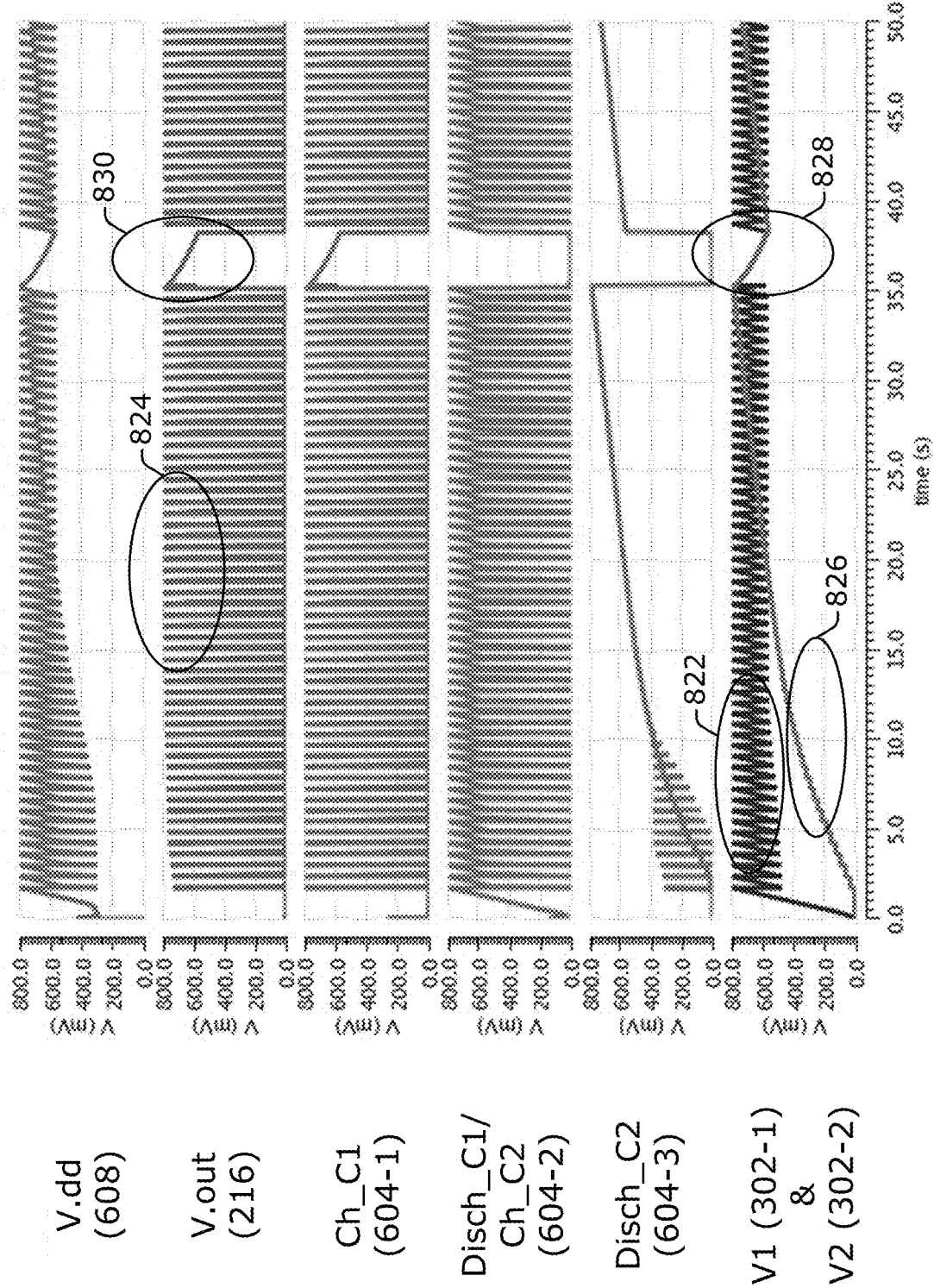
Figures 3, 8:
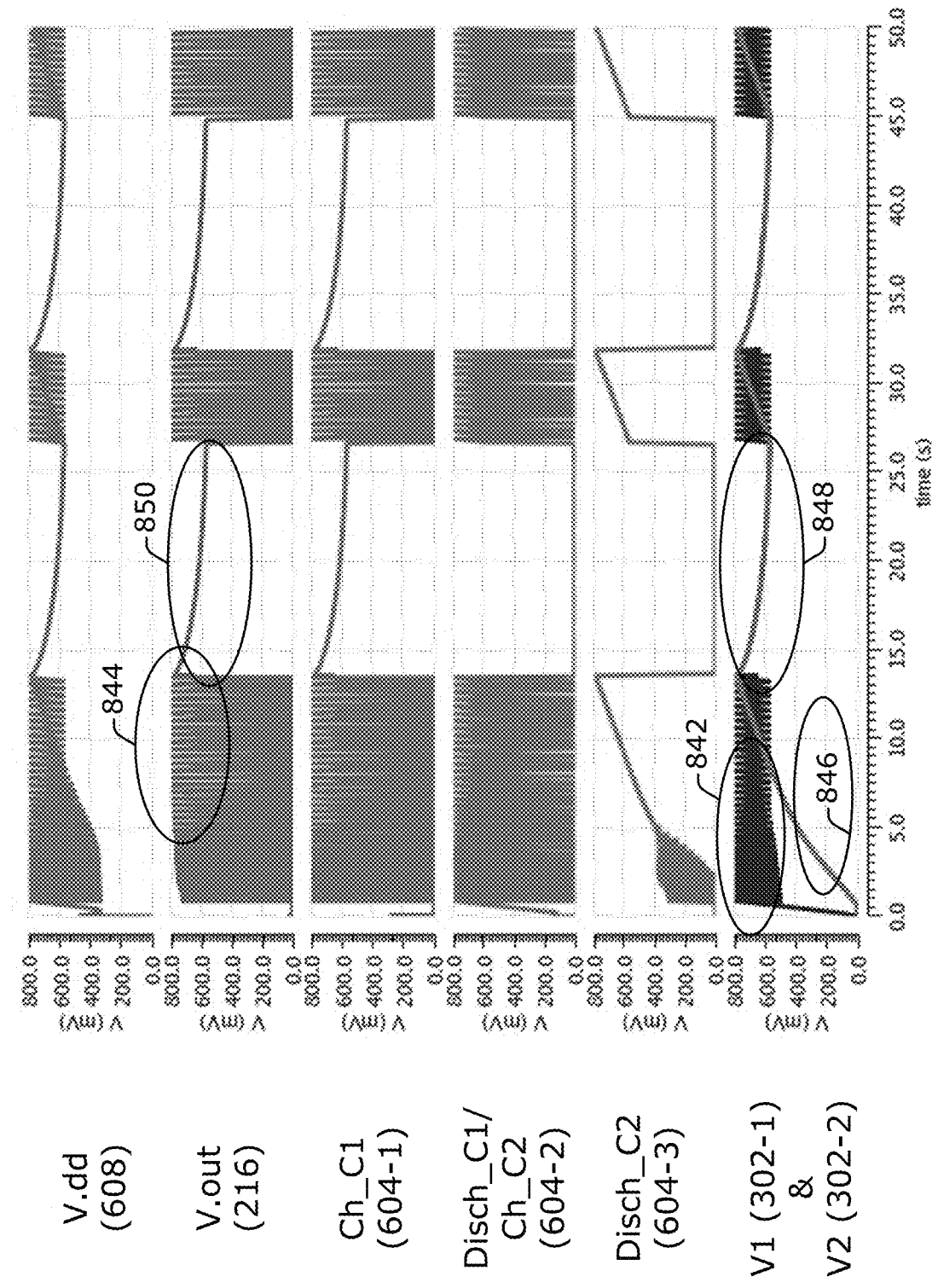

FIGS. 8-1 to 8-3 are three graphs that illustrate example voltage levels of the circuit of FIG. 6 versus time for three different example received power levels. These three received power levels correspond to a low RF power level (e.g., a received current of 0.1 microamps (uA)) for FIG. 8-1, a medium RF power level (e.g., a received current of 0.5 microamps (uA)) for FIG. 8-2, and a high RF power level (e.g., a received current of 1 microamp (uA)) for FIG. 8-3. The example voltage levels range along the ordinate axis (or y-axis) from 0 volts to 800 millivolts (mV) for reach respective graph. The example time span ranges along a common abscissa axis (or x-axis) from 0 seconds(s) to 50 seconds.

The depicted voltage levels and control signals include the following. The first two uppermost graphs correspond to an input voltage (V.dd) at the output 608 of the rectifier 304 and an output voltage (V.out) at the power supply node 216. The next three middle graphs correspond to three control signals: a first capacitor charging command ("Ch_C1") for the first control signal 604-1, a first capacitor discharging command ("Disch_C1") or second capacitor charging command ("Ch_C2") for the second control signal 604-2, and a second capacitor discharging command ("Disch_C2") for the third control signal 604-3. The lowermost graph corresponds to two voltage levels: a first voltage (V1) of the first capacitor 302-1 (upper portion) and a second voltage (V2) of the second capacitor 302-2 (lower portion).

In FIG. 8-1, at 802, the first voltage (V1) is shown increasing, dropping after the first capacitor 302-1 is electrically connected to the load based on the first voltage (V1) reaching a given threshold, and then climbing again after disconnection. This process repeats. Thus, the load may be operable between a lower minimum voltage threshold and an upper minimum voltage threshold of the capacitor(s). As shown at 804, the output voltage (V.out) is non-zero for only relatively brief periods about every 3.5 seconds in this example scenario. At 806, it is apparent that the second voltage (V2) of the second capacitor 302-2 does not reach a minimum threshold voltage for powering the load within the 50 seconds. As shown at 808, the input voltage (V.dd) continues to repeatedly drop precipitously over the 50 seconds.

In FIG. 8-2, the received power provides a current that is five times higher than that of FIG. 8-1. Accordingly, the first voltage (V1) reaches the peak voltage for the first voltage threshold (V.Th1) more frequently as shown at 822. At 824, the output voltage (V.out) has a non-zero voltage more frequently also as compared to FIG. 8-1. Further, the second voltage (V2) of the second capacitor 302-2 increases steadily as indicated at 826. More importantly, at around 35 seconds, the second capacitor 302-2 can power the load continuously for about three seconds. This is shown at 828 for the second voltage (V2) and at 830 for the output voltage (V.out). As compared to a circuit that lacks a second, relatively larger capacitor, the circuit diagram of FIG. 6 can keep the load operative for a greater period of time-which is 34% versus 28% of the time in this example scenario of FIG. 8-2.

In FIG. 8-3, the received power provides a current that is 10 times higher than that of FIG. 8-1 and double that of FIG. 8-2. Accordingly, the first voltage (V1) reaches the peak voltage for the first voltage threshold (V.Th1) even more frequently as shown at 842. At 844, the output voltage (V.out) has a non-zero voltage more frequently also as compared to FIG. 8-2. Further, the second voltage (V2) of the second capacitor 302-2 increases steadily and relatively quickly as indicated at 846. More importantly, at around 14 seconds, the second capacitor 302-2 can power the load continuously for about 13 seconds. This is shown at 848 for the second voltage (V2) and at 850 for the output voltage (V.out). Moreover, another period of continuous powering of the load by the second capacitor 302-2 starts around the 32 second mark and again lasts for about 13 seconds. As compared to a circuit that lacks a second, relatively larger capacitor, the circuit diagram of FIG. 6 can keep the load operative for a greater period of time-which is 88% versus 56% of the time in this example scenario of FIG. 8-3.

Figure 9:
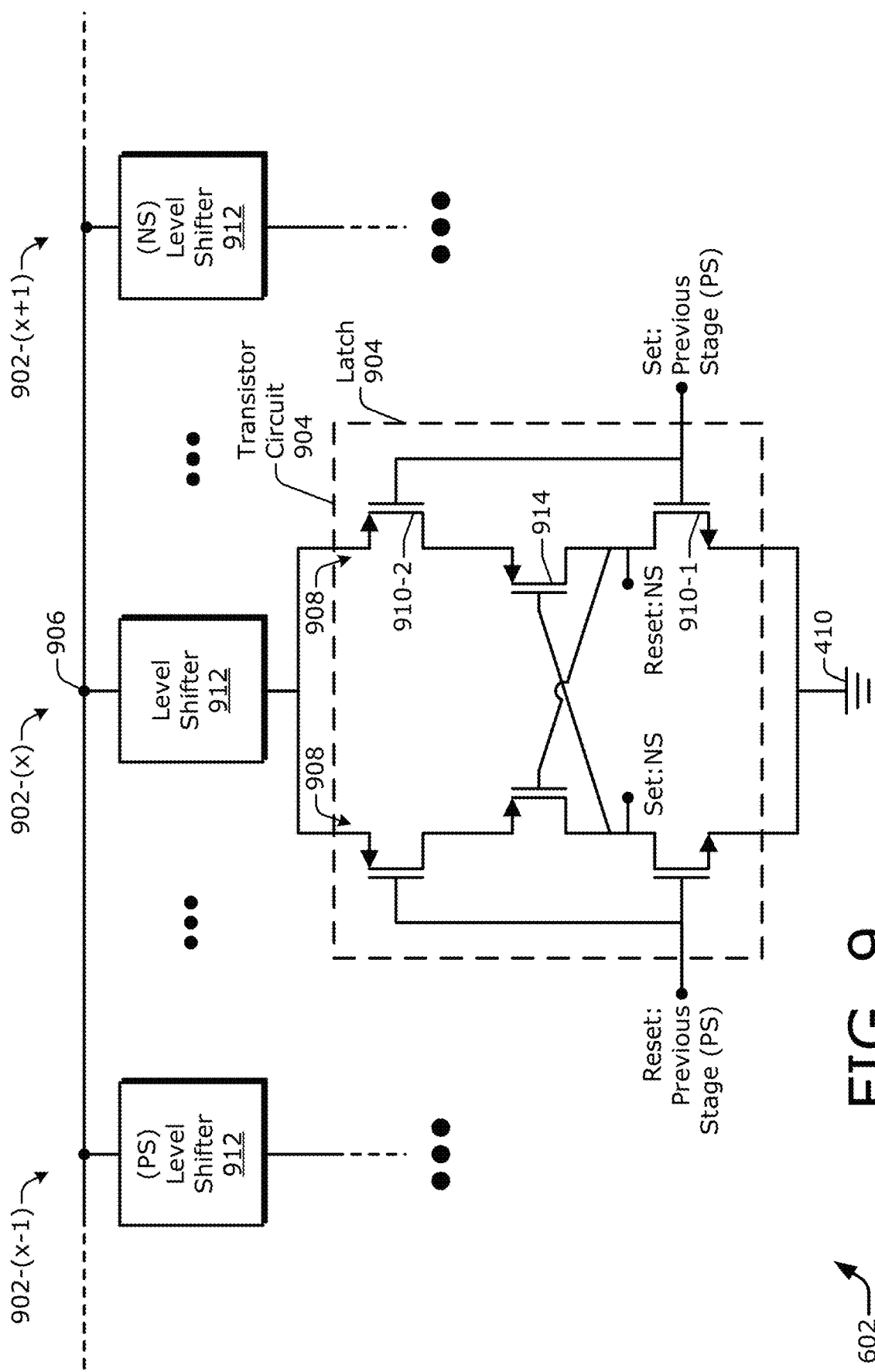
FIG. 9 is a circuit diagram of an example voltage monitor, such as one that can be used in a circuit of FIG. 4 or 6.

FIG. 9 is a circuit diagram of an example voltage monitor 602, such as one that can be used in a circuit of FIG. 4 or 6. As illustrated, the voltage monitor 602 can include multiple stages 902-(x−1), 902-(x), 902-(x+1). The stage 902-(x−1) can function as a previous stage (PS) relative to the stage 902-(x). The stage 902-(x+1) can function as a next stage (NS) relative to the stage 902-(x). Each stage 902 can detect a higher or lower voltage level as compared to an "adjacent" stage. Although three stages are shown, a voltage monitor 602 may include more or fewer such stages.

In example implementations, each stage 902 is coupled to a node 906, such as a node at which voltage is being monitored (e.g., a node 408, a first node 606-1, a second node 606-2, or another node at which a voltage of a capacitor is being monitored). The stage 902 can be coupled between the node 906 and a power distribution network node, such as supply voltage node or a ground nod 410 (which is depicted). Each stage 902 can include at least one transistor circuit 904 and at least one level shifter 912. The level shifter 912 and the transistor circuit 904 are coupled together in series between the node 906 and the ground 410.

The transistor circuit 904 may function as a latch (or latch 904) and can include at least one transistor column 908 (or transistor stack 908). As shown, the transistor circuit 904 includes a pair of transistor columns 908. The pair of transistor columns 908 can be coupled together in parallel between the level shifter 912 and the ground 410. Each transistor column 908 includes at least two transistors. The at least two transistors include a first transistor 910-1 and a second transistor 910-2 that are coupled together in series between the level shifter 912 and the ground 410. The at least two transistors can also include a transistor 914 that is cross-coupled with another transistor of the other transistor column 908.

In some implementations, the first and second transistors 910-1 and 910-2 are coupled to a same control signal, but these two transistors 910-1 and 910-2 have opposite doping. For example, the first transistor 910-1 is shown as an NFET, and the second transistor 910-2 is shown as a PFET. Alternatively, the two transistors may be PNP and NPN BJTs. Thus, if a control signal turns one transistor off, the control signal turns the other transistor on, or vice versa. This arrangement limits current flow along the transistor column 908 because one transistor or the other can be turned off during operation. In example operational modes, the first transistor 910-1 accepts a control signal (Set) from a previous stage (PS) at the control terminal thereof. The first transistor 910-1 also produces a control signal (Reset) for the next stage (NS) at a channel terminal thereof based on the previous stage (PS) control signal (Set).

In example aspects, an energy harvester 106 can include at least one voltage monitor 602 that is coupled to a node 906 corresponding to a first capacitor 302-1. The voltage monitor 602 includes a level shifter 912 and a transistor circuit 904. The transistor circuit 904 is coupled in series with the level shifter 912 between the node 906 and a power distribution network node, such as a ground node 410. The transistor circuit 904 can include a first transistor 910-1 and a second transistor 910-2, with the second transistor 910-2 coupled in series with the first transistor 910-1. The first transistor 910-1 is turned off in conjunction with the second transistor 910-2 being turned on based on transistor type and the control signal(s) coupled thereto.

In additional example aspects, the second transistor 910-2 is turned off in conjunction with the first transistor 910-1 being turned on. In some cases, to effectuate this condition of having the two transistors operate in different open versus closed states, a first control terminal of the first transistor 910-1 and a second control terminal of the second transistor 910-2 can be coupled to a same control signal. Further, the first transistor 910-1 can be realized as an n-channel field-effect transistor (NFET), and the second transistor 910-2 can be realized as a p-channel field-effect transistor (PFET), or vice versa.

Figure 10:
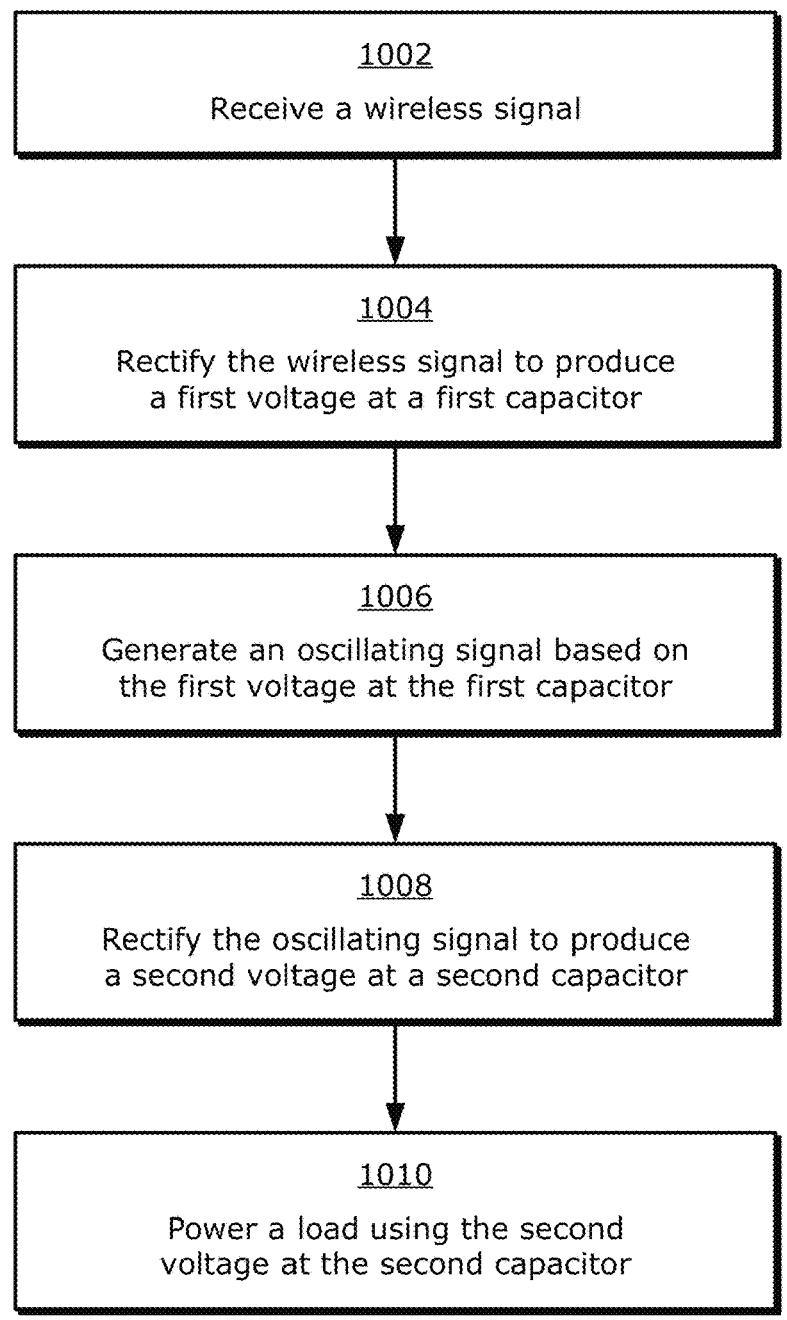
FIG. 10 is a flow diagram illustrating an example process for operating a multi-capacitor energy harvester.

FIG. 10 is a flow diagram illustrating an example process 1000 for operating a multi-capacitor energy harvester. The process 1000 includes five blocks 1002-1010 that specify operations that can be performed for a method. However, operations are not necessarily limited to the order shown in the figures or described herein, for the operations may be implemented in alternative orders or in fully or partially overlapping manners. Also, more, fewer, and/or different operations may be implemented to perform a respective process or an alternative process.

In example implementations, operations represented by the illustrated blocks of each process may be performed by an apparatus, such as the apparatus 112 of FIG. 1 or the electronic tag 102 thereof. More specifically, the operations of the respective processes may be performed by an energy harvester 106 in conjunction with an antenna 104 and energy storage 108. Although some of the description herein focusses on an electronic tag, the described principles (e.g., corresponding to devices, circuitry, techniques, and processes) are not so limited. These principles are also applicable to other apparatuses having the described components or circuitry or performing the described techniques or processes.

At block 1002, a wireless signal is received. For example, an apparatus 112 can receive a wireless signal 120. For instance, an antenna 104 of an electronic tag 102 may receive a radio-frequency signal.

At block 1004, the wireless signal is rectified to produce a first voltage at a first capacitor. For example, a first rectifier 304-1 can rectify the wireless signal 120 to produce a first voltage (V1) at a first capacitor 302-1. In some cases, the first rectifier 304-1 may rectify an alternating-current signal 502 that is accepted via an input of the first rectifier 304-1 to provide a first direct-current signal 504 to a node 408 corresponding to the first voltage (V1) of the first capacitor 302-1 via an output of the first rectifier 304-1.

At block 1006, an oscillating signal is generated based on the first voltage at the first capacitor. For example, an oscillator 402 can generate an oscillating signal 506 based on the first voltage (V1) at the first capacitor 302-1. The oscillator 402 may include, for example, an inductive-capacitive (LC) oscillator, a ring oscillator, a relaxation oscillator, some combination thereof, and so forth. The oscillator 402 may accept the first voltage (V1) from the first capacitor 302-1 via an input 404 of the oscillator 402 and may provide the oscillating signal 506 via an output 406 of the oscillator 402.

At block 1008, the oscillating signal is rectified to produce a second voltage at a second capacitor. For example, a second rectifier 304-2 can rectify the oscillating signal 506 to produce a second voltage (V2) at a second capacitor 302-2. Here, the second rectifier 304-2 may convert an alternating-current oscillating signal 506 to a second direct-current signal 508 to add charge to the second capacitor 302-2. The second rectifier 304-2 may accept the alternating-current oscillating signal 506 at an input thereof and produce the second direct-current signal 508 at an output of the second rectifier 304-2.

At block 1010, a load is powered using the second voltage at the second capacitor. For example, the second voltage (V2) at the second capacitor 302-2 can power a load 110 of the apparatus 112. This powering may be performed by closing a switch coupled between the second capacitor 302-2 and a power supply node 216 that is configured to provide a supply voltage to the load 110, such as a processor 204 and a memory 206.

In some aspects, charge is transferred from the first capacitor 302-1 to the second capacitor 302-2 such that a maximum value of the second voltage (V2) is greater than a maximum value of the first voltage (V1). This can be achieved, for instance, by employing a smaller capacitor as the second capacitor 302-2 as compared to the first capacitor 302-1.

Figure 11:
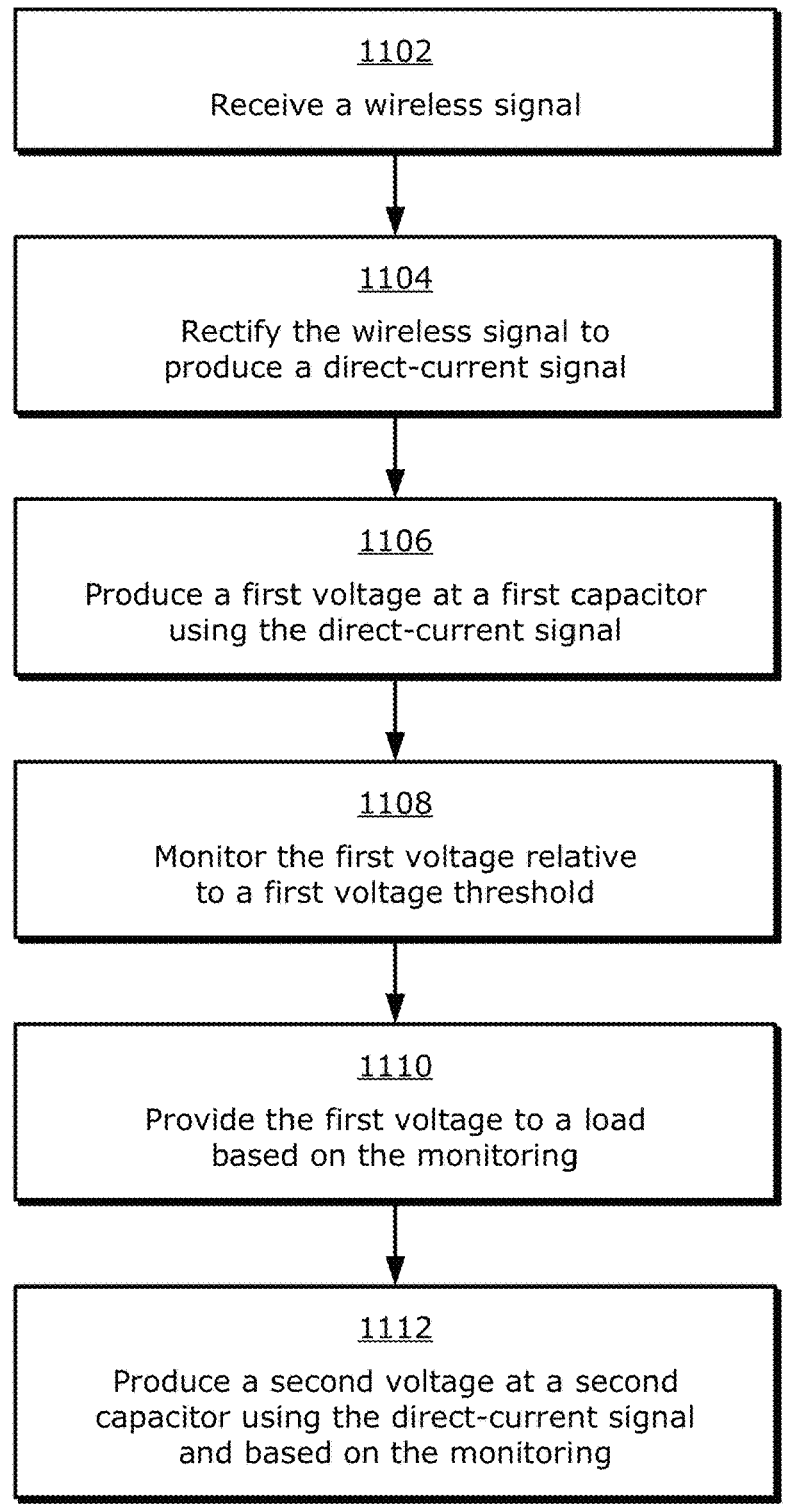
FIG. 11 is a flow diagram illustrating another example process for operating a multi-capacitor energy harvester.

FIG. 11 is a flow diagram illustrating another example process 1100 for operating a multi-capacitor energy harvester. The process 1100 includes six blocks 1102-1112 that specify operations that can be performed for a method. However, operations are not necessarily limited to the order shown in the figures or described herein, for the operations may be implemented in alternative orders or in fully or partially overlapping manners. Also, more, fewer, and/or different operations may be implemented to perform a respective process or an alternative process.

In example implementations, operations represented by the illustrated blocks of each process may be performed by an apparatus, such as the apparatus 112 of FIG. 1 or the electronic tag 102 thereof. More specifically, the operations of the respective processes may be performed by an energy harvester 106 in conjunction with an antenna 104 and energy storage 108. Although some of the description herein focusses on an electronic tag, the described principles (e.g., corresponding to devices, circuitry, techniques, and processes) are not so limited. These principles are also applicable to other apparatuses having the described components or circuitry or performing the described techniques or processes.

At block 1102, a wireless signal is received. For example, an apparatus 112 can receive a wireless signal 120. For instance, an antenna 104 of an electronic tag 102 may receive a signal having a radio frequency.

At block 1104, the wireless signal is rectified to produce a direct-current signal. For example, a rectifier 304 can rectify the wireless signal 120 to produce a direct-current signal 504. In some cases, the rectifier 304 may rectify an alternating-current signal 502 that is accepted via an input of the rectifier 304 to provide, via an output 608 of the rectifier 304, a direct-current signal 504 for an input voltage (V.dd) that switchably corresponds to a first capacitor 302-1 or a second capacitor 302-2.

At block 1106, a first voltage is produced at a first capacitor using the direct-current signal. For example, a first capacitor 302-1 can accumulate charge to produce a first voltage (V1) using the direct-current signal 504. To do so, control circuitry 308 may close a first switch 306-1 that is coupled between the output 608 of the rectifier 304 and the first capacitor 302-1. The closing of the first switch 306-1 may be based, at least partially, on the first voltage (V1) or an initial condition.

At block 1108, the first voltage is monitored relative to a first voltage threshold. For example, the energy harvester 106 can monitor the first voltage (V1) relative to a first voltage threshold (V.Th1). Here, a first voltage monitor 602-1 may detect that the first voltage (V1) has reached a minimum voltage threshold for operating a load 110 of the apparatus 112.

At block 1110, the first voltage is provided to a load based on the monitoring. For example, the energy harvester 106 can provide the first voltage (V1) to a load 110 based on the monitoring of block 1108. Thus, the control circuitry 308 may close a third switch 306-3 that electrically connects the first capacitor 302-1 having the first voltage (V1) to the load 110 based on the first voltage (V1) reaching the minimum voltage threshold for operating the load 110.

At block 1112, a second voltage is produced at a second capacitor using the direct-current signal and based on the monitoring. For example, a second capacitor 302-2 can accumulate charge to produce a second voltage (V2) using the direct-current signal 504 and based on the monitoring of block 1108. This may be performed by the control circuitry 308 closing a second switch 306-2 coupled between the input voltage (V.dd) and a terminal of the second capacitor 302-2. To do so, the first voltage monitor 602-1 may close the second switch 306-2 based on the first voltage (V1) reaching the minimum voltage threshold for operating the load 110. Based on the same voltage detection, the first voltage monitor 602-1 may also open the first switch 306-1.

In example aspects, the second voltage (V2) of the second capacitor 302-2 can be monitored relative to a second voltage threshold (V.Th2). In some cases, a second voltage monitor 602-2 may perform the monitoring via a second node 606-2 that is coupled between the second capacitor 302-2 and the power supply node 216. Further, the second voltage (V2) can be provided to the load 110 based on the monitoring of the second voltage (V2). The control circuitry 308, for instance, can cause the second voltage monitor 602-2 to close a fourth switch 306-4 responsive to the second voltage (V2) reaching the second voltage threshold (V.Th2), which may be substantially the same as (e.g., within 1%, 5%, or even 10% of) the first voltage threshold (V.Th1).

Implementation Examples

This section describes some aspects of example implementations and/or example configurations related to the apparatuses and/or processes presented above.

Example aspect 1: An apparatus comprising:
a first capacitor;
a second capacitor; and
an energy harvester comprising:
  a first rectifier coupled to the first capacitor;
  an oscillator including an input and an output, the input coupled to the first capacitor; and
  a second rectifier coupled between the output of the oscillator and the second capacitor.

Example aspect 2: The apparatus of example aspect 1, wherein the first capacitor has a first capacitance that is greater than a second capacitance of the second capacitor.

Example aspect 3: The apparatus of example aspect 2, wherein the first capacitance of the first capacitor is at least ten times greater than the second capacitance of the second capacitor.

Example aspect 4: The apparatus of example aspect 1 or 2, wherein:
the oscillator is configured to transfer charge from the first capacitor to the second capacitor.

Example aspect 5: The apparatus of example aspect 4, wherein:
the oscillator is configured to reduce a first voltage of the first capacitor and increase a second voltage of the second capacitor by transferring the charge from the first capacitor to the second capacitor; and
a first level of the first voltage of the first capacitor is less than a second level of the second voltage of the second capacitor, the first level of the first voltage corresponding to a first time before the oscillator starts transferring the charge, and the second level of the second voltage corresponding to a second time after the oscillator starts transferring the charge.

Example aspect 6: The apparatus of any one of the preceding example aspects, wherein the oscillator comprises at least one of:
an inductive-capacitive (LC) oscillator;
a ring oscillator; or
a relaxation oscillator.

Example aspect 7: The apparatus of any one of the preceding example aspects, wherein:
the first capacitor is coupled between the first rectifier and the input of the oscillator; and
the energy harvester comprises a switch coupled between the first capacitor and the input of the oscillator.

Example aspect 8: The apparatus of example aspect 7, wherein the energy harvester comprises:
a voltage monitor connected to a node coupled between the first rectifier and the input of the oscillator, the voltage monitor configured to detect a voltage at the node; and
the switch is configured to be opened or closed based on the voltage at the node.

Example aspect 9: The apparatus of example aspect 7 or 8, wherein:
the oscillator is configured to transfer charge from the first capacitor to the second capacitor responsive to the switch being in a closed state.

Example aspect 10: The apparatus of any one of the preceding example aspects, further comprising:
an antenna coupled to the first rectifier, the antenna configured to receive an alternating-current signal,
wherein the first rectifier is configured to accept the alternating-current signal from the antenna and rectify the alternating-current signal to provide a first direct-current signal to the first capacitor to generate a first voltage at the first capacitor.

Example aspect 11: The apparatus of example aspect 10, wherein:
the oscillator is configured to generate an oscillating signal at the output of the oscillator based on accepting the first voltage from the first capacitor at the input of the oscillator; and
the second rectifier is configured to accept the oscillating signal from the oscillator and rectify the oscillating signal to provide a second direct-current signal to the second capacitor to generate a second voltage at the second capacitor.

Example aspect 12: The apparatus of any one of the preceding example aspects, wherein the apparatus comprises an electronic tag.

Example aspect 13: The apparatus of example aspect 12, wherein the electronic tag comprises:
  a transmitter coupled to the second capacitor; and
  a processor coupled to the second capacitor and the transmitter, the processor configured to transmit a signal including data that identifies at least one object associated with the electronic tag.

Example aspect 14: A method of operating a multi-capacitor energy harvester, the method comprising:
  receiving a wireless signal;
  rectifying the wireless signal to produce a first voltage at a first capacitor;
  generating an oscillating signal based on the first voltage at the first capacitor;
  rectifying the oscillating signal to produce a second voltage at a second capacitor; and
  powering a load using the second voltage at the second capacitor.

Example aspect 15: The method of example aspect 14, further comprising:
  transferring charge from the first capacitor to the second capacitor such that a maximum value of the second voltage is greater than a maximum value of the first voltage.

Example aspect 16: An apparatus for harvesting energy using multiple capacitors, the apparatus comprising:
  means for receiving a wireless signal;
  means for rectifying the wireless signal to produce a first voltage at a first capacitor;
  means for generating an oscillating signal based on the first voltage at the first capacitor;
  means for rectifying the oscillating signal to produce a second voltage at a second capacitor; and
  means for powering a load using the second voltage at the second capacitor.

Example aspect 17: An apparatus comprising:
  a first capacitor;
  a second capacitor;
  a power supply node; and
  an energy harvester comprising:
    a rectifier coupled to the first capacitor and the second capacitor;
    a first switch coupled between the rectifier and the first capacitor;
    a second switch coupled between the rectifier and the second capacitor, the second capacitor coupled between the second switch and the power supply node; and
    a third switch coupled between the first capacitor and the power supply node.

Example aspect 18: The apparatus of example aspect 17, wherein the energy harvester comprises:
  a fourth switch coupled between the second capacitor and the power supply node.

Example aspect 19: The apparatus of example aspect 18, wherein the energy harvester comprises:
  a first voltage monitor connected to a first node coupled between the first switch and the third switch; and
  a second voltage monitor connected to a second node coupled between the second switch and the fourth switch.

Example aspect 20: The apparatus of example aspect 19, wherein:
  the first voltage monitor is coupled to a first control terminal of the first switch, a second control terminal of the second switch, and a third control terminal of the third switch; and
  the second voltage monitor is coupled to a fourth control terminal of the fourth switch.

Example aspect 21: The apparatus of example aspect 19 or 20, wherein the energy harvester is configured to operate the first switch and the second switch with the first voltage monitor to use the rectifier to charge the first capacitor to a first voltage threshold before using the rectifier to charge the second capacitor.

Example aspect 22: The apparatus of any one of example aspects 19-21, wherein the energy harvester is configured to operate the fourth switch with the second voltage monitor to connect the second capacitor to the power supply node responsive to the second capacitor reaching a second voltage threshold.

Example aspect 23: The apparatus of example aspect 17, wherein the energy harvester comprises:
  a first voltage monitor connected to a first node coupled between the first switch and the third switch, the first voltage monitor coupled to a first control terminal of the first switch.

Example aspect 24: The apparatus of example aspect 23, wherein the first voltage monitor is configured to:
  monitor a first voltage of the first capacitor via the first node;
  generate a first control signal based on the first voltage; and
  provide the first control signal to the first control terminal of the first switch.

Example aspect 25: The apparatus of example aspect 24, wherein:
  the first voltage monitor is coupled to a second control terminal of the second switch and a third control terminal of the third switch; and
  the first voltage monitor is configured to:
    generate a second control signal based on the first voltage; and
    provide the second control signal to the second control terminal of the second switch and the third control terminal of the third switch.

Example aspect 26: The apparatus of any one of example aspects 17 or 23-25, wherein:
  the energy harvester comprises:
    a fourth switch coupled between the second capacitor and the power supply node; and
    a second voltage monitor connected to a second node coupled between the second switch and the fourth switch, the second voltage monitor coupled to a fourth control terminal of the fourth switch; and the second voltage monitor is configured to:
    monitor a second voltage of the second capacitor via the second node;
    generate a third control signal based on the second voltage; and
    provide the third control signal to the fourth control terminal of the fourth switch.

Example aspect 27: The apparatus of any one of example aspects 17-26, wherein the first capacitor has a first capacitance that is less than a second capacitance of the second capacitor.

Example aspect 28: The apparatus of any one of example aspects 17-27, wherein:

the energy harvester comprises at least one voltage monitor coupled to a node corresponding to the first capacitor; and the at least one voltage monitor comprises:
a level shifter; and
a transistor circuit coupled in series with the level shifter between the node and a power distribution network node, the transistor circuit comprising:
a first transistor; and
a second transistor coupled in series with the first transistor, the first transistor configured to be turned off in conjunction with the second transistor being turned on.

Example aspect 29: The apparatus of example aspect 28, wherein:
the second transistor is configured to be turned off in conjunction with the first transistor being turned on; and
a first control terminal of the first transistor and a second control terminal of the second transistor are coupled to a same control signal.

Example aspect 30: A method of operating a multi-capacitor energy harvester, the method comprising:
receiving a wireless signal;
rectifying the wireless signal to produce a direct-current signal;
producing a first voltage at a first capacitor using the direct-current signal;
monitoring the first voltage relative to a first voltage threshold;
providing the first voltage to a load based on the monitoring; and
producing a second voltage at a second capacitor using the direct-current signal and based on the monitoring.

Example aspect 31: The method of example aspect 30, further comprising:
monitoring the second voltage relative to a second voltage threshold; and
providing the second voltage to the load based on the monitoring of the second voltage.

Example aspect 32: An apparatus for harvesting energy using multiple capacitors, the apparatus comprising:
means for receiving a wireless signal;
means for rectifying the wireless signal to produce a direct-current signal;
means for producing a first voltage at a first capacitor using the direct-current signal;
means for monitoring the first voltage relative to a first voltage threshold;
means for providing the first voltage to a load responsive to the means for monitoring; and
means for producing a second voltage at a second capacitor using the direct-current signal and responsive to the means for monitoring.

CONCLUSION

As used herein, the terms "couple," "coupled," or "coupling" refer to a relationship between two or more components that are in operative communication with each other to implement some feature or realize some capability that is described herein. The coupling can be realized using, for instance, a physical line, such as a metal trace or wire, or an electromagnetic coupling, such as with a transformer. A coupling can include a direct coupling or an indirect coupling. A direct coupling refers to connecting discrete circuit elements via a same node without an intervening element. An indirect coupling refers to connecting discrete circuit elements via one or more other devices or other discrete circuit elements, including two or more different nodes.

The word "terminal" (e.g., including a "first terminal" or an "input terminal," or simply "input") represents at least a point of electrical connection at or proximate to the input or output of a component or between two or more components (e.g., active or passive circuit elements or parts). Although at times a terminal may be visually depicted in a drawing as a single point (or a circle), the terminal can represent an inter-connected portion of a physical circuit or network that has at least approximately a same voltage potential at or along the portion. In other words, a single-ended terminal can represent at least one point (e.g., a node) of multiple points along a conducting medium (e.g., a wire or trace) that exists between electrically connected components. In some cases, a "terminal" can represent at least one node that represents or corresponds to an input or an output of a component, such as a rectifier, a voltage monitor, or an oscillator. Similarly, a "port" or a "node" may represent one or more points with at least approximately a same voltage potential relative to an input or output of a component.

The terms "first," "second," "third," and other numeric-related indicators are used herein to identify or distinguish similar or analogous items from one another within a given context-such as a particular implementation, a single drawing figure, a given component, or a claim. Thus, a first item in one context may differ from a first item in another context. For example, an item identified as a "first capacitor" in one context may be identified as a "second capacitor" in another context. Similarly, a "first rectifier" or a "first switch" in one claim may be recited as a "second rectifier" or a "third switch," respectively, in a different claim or drawing description.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Although implementations for realizing multi-capacitor energy harvesting have been described in language specific to certain features and/or methods, the subject of the appended claims is not necessarily limited to the specific features or methods described. Rather, the specific features and methods are disclosed as example implementations for realizing multi-capacitor energy harvesting.

What is claimed is:
1. An apparatus comprising:
a first capacitor;
a second capacitor; and
an energy harvester comprising:
a first rectifier coupled to the first capacitor;
an oscillator including an input and an output, the input coupled to the first capacitor; and a second rectifier coupled between the output of the oscillator and the second capacitor.

2. The apparatus of claim 1, wherein the first capacitor has a first capacitance that is greater than a second capacitance of the second capacitor.

3. The apparatus of claim 2, wherein:
the oscillator is configured to transfer charge from the first capacitor to the second capacitor.

4. The apparatus of claim 3, wherein:
the oscillator is configured to reduce a first voltage of the first capacitor and increase a second voltage of the second capacitor by transferring the charge from the first capacitor to the second capacitor; and
a first level of the first voltage of the first capacitor is less than a second level of the second voltage of the second capacitor, the first level of the first voltage corresponding to a first time before the oscillator starts transferring the charge, and the second level of the second voltage corresponding to a second time after the oscillator starts transferring the charge.

5. The apparatus of claim 1, wherein:
the first capacitor is coupled between the first rectifier and the input of the oscillator; and
the energy harvester comprises a switch coupled between the first capacitor and the input of the oscillator.

6. The apparatus of claim 5, wherein the energy harvester comprises:

a voltage monitor connected to a node coupled between the first rectifier and the input of the oscillator, the voltage monitor configured to detect a voltage at the node; and
the switch is configured to be opened or closed based on the voltage at the node.

7. The apparatus of claim 1, further comprising:
an antenna coupled to the first rectifier, the antenna configured to receive an alternating-current signal,
wherein the first rectifier is configured to accept the alternating-current signal from the antenna and rectify the alternating-current signal to provide a first direct-current signal to the first capacitor to generate a first voltage at the first capacitor.

8. The apparatus of claim 7, wherein:
the oscillator is configured to generate an oscillating signal at the output of the oscillator based on accepting the first voltage from the first capacitor at the input of the oscillator; and
the second rectifier is configured to accept the oscillating signal from the oscillator and rectify the oscillating signal to provide a second direct-current signal to the second capacitor to generate a second voltage at the second capacitor.

9. The apparatus of claim 7, wherein the apparatus comprises an electronic tag.

* * * * *